United States Patent
Bustos et al.

(10) Patent No.: US 7,565,929 B2
(45) Date of Patent: *Jul. 28, 2009

(54) DEGRADABLE MATERIAL ASSISTED DIVERSION

(75) Inventors: Oscar Bustos, Castle Rock, CO (US); Christopher N. Fredd, Ashville, NY (US); Yiyan Chen, Sugar Land, TX (US); Carlos Abad, Richmond, TX (US); Goke Adeogun, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/872,973

(22) Filed: Oct. 16, 2007

(65) Prior Publication Data

US 2008/0093073 A1 Apr. 24, 2008

Related U.S. Application Data

(60) Provisional application No. 60/862,694, filed on Oct. 24, 2006.

(51) Int. Cl.
*E21B 43/267* (2006.01)
*E21B 33/138* (2006.01)
(52) U.S. Cl. .................. 166/279; 166/280.2; 166/281; 166/283; 166/294; 166/300; 166/308.3
(58) Field of Classification Search .................. None
See application file for complete search history.

(56) References Cited

U.S. PATENT DOCUMENTS

| 6,380,138 | B1 | 4/2002 | Ischy |
| 6,837,309 | B2 | 1/2005 | Boney |
| 7,004,255 | B2 | 2/2006 | Boney |
| 7,166,560 | B2 | 1/2007 | Still |
| 7,275,596 | B2 | 10/2007 | Willberg |

(Continued)

OTHER PUBLICATIONS

SPE 39945—T.W. Hewett, C.J. Spence; Induced Stress Diversion: A Novel Approach to Fracturing Multiple Pay Sands of the NBU Field, Uintah Co. Utah; Society of Petroleum Engineers; 1998; Presented at 1998 SPE Rocky Mountain Regional/Low Permeability Reservoirs Symposium and Exhibition in Denver, Colorado; Apr. 5-8, 1998.

(Continued)

*Primary Examiner*—Zakiya W. Bates
(74) *Attorney, Agent, or Firm*—Dave Cate; Robin Nava; Thomas O. Mitchell

(57) ABSTRACT

Degradable material assisted diversion (DMAD) methods for well treatment, DMAD treatment fluids, and removable plugs for DMAD in downhole operations. A slurry of solid degradable material is injected into the well, a plug of the degradable material is formed, a downhole operation is performed around the plug diverter, and the plug is then degraded for removal. Degradation triggers can be temperature or chemical reactants, with optional accelerators or retarders to provide the desired timing for plug removal. In multilayer formation DMAD fracturing, the plug isolates a completed fracture while additional layers are sequentially fractured and plugged, and then the plugs are removed for flowback from the fractured layers. In DMAD fluids, an aqueous slurry can have a solids phase including a degradable material and a fluid phase including a viscoelastic surfactant. The solids phase can be a mixture of fibers and a particulate material.

25 Claims, 10 Drawing Sheets

U.S. PATENT DOCUMENTS

| | | |
|---|---|---|
| 2003/0060374 A1 | 3/2003 | Cooke, Jr. |
| 2004/0261993 A1 | 12/2004 | Nguyen |
| 2006/0042797 A1 | 3/2006 | Fredd |
| 2006/0054324 A1 | 3/2006 | Sullivan |
| 2006/0088603 A1 | 4/2006 | Giordano |
| 2006/0113077 A1* | 6/2006 | Willberg et al. .......... 166/280.1 |
| 2006/0169453 A1 | 8/2006 | Savery |
| 2007/0066254 A1 | 3/2007 | Tsuchie |

OTHER PUBLICATIONS

SPE 37489—SK Schubarth, SL Cobb & Rg Jeffrey; Understanding Proppant Closure Stress; Society of Petroleum Engineers; 1997; Presented at 1997 SPE Production Operations Symposium in Oklahoma City, OK; Mar. 9-11, 1997.

* cited by examiner

DEGRADABLE MATERIAL ASSISTED DIVERSION

CROSS REFERENCE TO RELATED APPLICATION

This application claims the benefit of U.S. provisional application Ser. No. 60/862,694, filed Oct. 24, 2006.

BACKGROUND OF THE INVENTION

The invention relates to stimulation of wells penetrating subterranean formations. In particular it relates to methods and compositions for the execution of multiple sequential well treatments and the temporary protection of previous treatments from subsequent treatments using a diversion technique.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well may be undesirably low. In this case, the well is stimulated, for example using hydraulic fracturing, chemical (usually acid) stimulation, or a combination of the two (called acid fracturing or fracture acidizing).

Hydraulic fracturing involves injecting fluids into a formation at high pressures and rates such that the reservoir rock fails and forms a fracture (or fracture network). Proppants are typically injected in fracturing fluids after the pad to hold the fracture(s) open after the pressures are released. In chemical (acid) stimulation treatments, flow capacity is improved by dissolving materials in the formation.

In hydraulic and acid fracturing, a first, viscous fluid called a pad is typically injected into the formation to initiate and propagate the fracture. This is followed by a second viscous fluid that contains a proppant to keep the fracture open after the pumping pressure is released. Granular proppant materials may include sand, ceramic beads, or other materials. In acid fracturing, the second fluid contains an acid or other chemical such as a chelating agent that can dissolve part of the rock, causing irregular etching of the fracture face and removal of some of the mineral matter, resulting in the fracture not completely closing when the pumping is stopped. When confinement of the fracture geometry is required, the use of surfactant based fluids such as viscoelastic surfactants (VES) is recommended. Occasionally, hydraulic fracturing is done by pumping at very high rates a low viscosity fluid containing friction reducing polymers (i.e., slick water) to minimize the damage caused by highly concentrated polymers or the cost of other viscosifiers. In addition, to further minimize the damage, low viscosity surfactant based fluids can be utilized as slickwater treatments.

When multiple hydrocarbon-bearing zones are stimulated by hydraulic fracturing or chemical stimulation, it is desirable to treat the multiple zones in multiple stages. In multiple zone fracturing, a first pay zone is fractured. Then, the fracturing fluid is diverted to the next stage to fracture the next pay zone. The process is repeated until all pay zones are fractured. Alternatively, several pay zones may be fractured at one time, if they are closely located with similar properties. Diversion may be achieved with various means. In the bridge plug technique (BPT), for example, the operator perforates, then fractures, then sets a bridge plug tool, and then repeats this process as necessary. This approach ensures 100% positive zone isolation by setting a packer between fractured and targeted zones. However, this approach is extremely costly. The costs come from extensive wireline service intervention, which requires additional time to perforate and to set and then retrieve the packer from the wellbore for each pay zone before and after a fracturing treatment. In addition, packer retrieval is sometimes risky.

In the flow through composite bridge plug (FTCBP) approach, which is a modification of the BPT, the FTCBP tool works as a BPT plug when there is higher pressure above it, such as during subsequent fracturing treatment. However, when the pressure is higher below the plug, such as when flowing the well back, the FTCBP lets fluid flow from below through the plug. Use of the FTCBP technique allows all preceding fractured zones to flow during completion of the well. This method has two advantages. First, it considerably reduces the shut-in time by flowing each fracture back early. Second, all previously treated zones help to clean up each new treatment. After a well is completed, the FTCBP can be drilled out easily or can be left in the well. This technique has proven to be a reliable tool that increases production. The main disadvantage is the cost and time needed to set the plug.

The sand plug technique (SPT) is similar to the BPT except that sand plugs are used instead of tools. The main idea is to fracture several pay zones sequentially via different perforation sets and set a sand plug at the end of each treatment stage to prevent flow beyond the plug, and thus divert the stress field for successive stages. This method substantially reduces time and costs because it requires no packer retrieval. However, due to initial in-situ stress variations, not all zones may be fractured. Furthermore, the proppant placement requires loading the wellbore with proppant, which may result in low efficiency of the treatment.

The limited entry (LE) approach, which is a simplified technique that does not require loading the wellbore with sand, makes the method more affordable. The method is used, for example, in combination with ball sealers to plug the stages, or by having differing numbers of perforations for the different stages. The LE method basically relies on creating an artificial pressure drop across a calculated number of perforations. From the number of perforations, the size of the perforations, and the injection rate, the pressure drop is calculated. This pressure differential is then adjusted through the number of perforations to create a designated pressure on the formation side of the perforations equal to the fracturing pressure. Knowing the exact fracturing pressure of each sand layer is an essential portion of the limited entry technique. In an infill-drilling program within a stratigraphic pay, the pressure of any given sand can vary considerably. Acquiring reliable pressure data involves testing each zone, adding time and cost to the completion. Without knowing the exact data, a treatment may result in little or no production from some sets of perforations.

Ball sealers usually comprise small rubber-coated balls suspended in the treating fluid and pumped into the well along with the treating fluid. The balls are carried down to the perforations communicating with the high permeability formation zone. The ball sealers seat on these perforations and divert the treating fluid to a formation zone having a lower permeability. In some cases, the presence of such ball sealers in the wellbore after the treatment presents operational problems during their retrieval. Use of degradable balls can help eliminate these problems, as reported in U.S. Pat. No. 6,380,138 to Ischy et al. Balls made of polyester degrade with time, forming soluble oligomers and allowing perforations to re-open.

The induced stress diversion technique (ISDT) is an application of staged hydraulic fracturing treatments without the use of any positive isolation, such as bridge plugs, frac baffles, sand plugs, or ball sealers. The ISDT combines the advantages of the LE and multi-staged fracturing techniques. With reference to FIG. 1, ISDT involves pumping multiple fracs in a well 10, e.g. first and second fractures 12, 14 in respective first and second pay zones 16, 18 stratified between non pay zones, and relying on the induced stress imparted by an earlier fracture stimulation to divert the subsequent fracture to the desired zone without positive zonal isolation. In this approach, the initial induced stress profile 20 from the first hydraulic fracturing stage 12 functions as input energy, together with the resulting induced stresses 22, to effectively divert the second stage 14 and subsequent fracs to the second pay zone 18 and successive stages. The ISDT procedure may be used to perforate and fracture multiple, discrete pay intervals by repeating the process as many times as needed. Some ISD techniques may include methods to induce screenouts to help with the diversion.

However, the ISDT requires good knowledge of reservoir properties. This makes ISDT not easily repeatable in areas with varying properties. To achieve maximum stress diversion, an optimized fracturing treatment is required based on mechanical properties of the formation. This often necessitates acquiring data using a design tool, such as a DataFRAC™ (Trade name of Schlumberger Technology Corp.), and successive redesigns of the approach. This takes time. In addition, redesign is strongly dependent on critical assumptions about formation properties. As a result, currently there is no reliable methodology to justify the use of ISDT in tight gas reservoirs. Therefore, there still exists a need for easy and reliable methods for diversion, multi-stage fracturing, or temporary sealing in the downhole environment.

Degradable materials have been used for fluid loss control and for diversion in the past. Examples include rock salt, graded rock salt, benzoic acid flakes, wax beads, wax buttons, oil-soluble resin material, etc. Degradable materials have been used in other downhole operations, such as disclosed in US 2006-0283591. However, these materials have generally been used in sizes, shapes and concentrations designed to build filter cakes on wellbore or fracture faces rather than to form consolidated plugs in wellbores, perforations, or fractures, e.g. under screen out conditions.

SUMMARY OF THE INVENTION

The present invention in various embodiments provides a method for treating a well with a degradable material assisted diversion (DMAD), a DMAD method for multilayer fracturing, well treatment fluids useful in DMAD procedures, and a removable composite plug formed with a degradable material to facilitate diversion procedures. The degradable material can degrade after a selected duration under the downhole conditions such that no additional intervention is needed to remove the plug. The temporary blockage by plug formation allows other well operations to be performed without damaging the existing fracture or without interference from the existing fracture.

In one embodiment, the method of well treatment can include: (a) injecting an aqueous slurry into a well penetrating a formation, wherein a solids phase of the slurry comprises an insoluble degradable material; (b) consolidating the degradable material to form a plug of the degradable material in a perforation, fracture, wellbore or combination thereof in the well; (c) performing a downhole operation in the well while the degradable material assists diversion from the plugged perforation, fracture, wellbore or combination thereof, wherein the downhole operation can be hydraulic fracturing, acidizing, well repair, installation of downhole equipment, and combinations thereof, and (d) degrading the consolidated degradable material to remove the plug and restore permeability to the perforation, fracture, wellbore or combination thereof. The downhole operations can include slickwater fracturing and acid fracturing as further examples.

In an embodiment, the degradable material can be a polymer of monomer-derived units such as esters, aromatic acids, amides, and the like, and combinations thereof. In an embodiment, the degradable material can be polymers and copolymers of lactide and glycolide; polyethyleneterephthalate (PET); polybutyleneterephthalate (PBT); polyethylenenaphthalenate (PEN); partially hydrolyzed polyvinyl acetate; and derivatives thereof, and combinations and mixtures thereof, and the like.

In an embodiment, the degradable material can be present in the slurry at a relatively high concentration, for example, at least 4.8 g/L (40 lbm/1,000 gal), at least 6 g/L (50 lbm/1,000 gal), or at least 7.2 g/L (60 lbm/1,000 gal). The method can include inducing a screenout of the solids phase to consolidate the degradable material.

In one embodiment, the solids phase can include fiber, and in another embodiment, a mixture of a fiber and a particulate material, e.g., having a distribution of sizes. As examples, the fiber can comprise the degradable material and the particulate material can be inert proppant, or the fiber and the particulate material can both comprise the degradable material, which can be the same or different material.

In one embodiment, the degradation can be triggered by a temperature change, and/or by chemical reaction between the degradable material and another reactant. Degradation can include dissolution of the degradable material.

In an embodiment of the method, a fluid phase of the slurry can include a viscoelastic surfactant (VES), a co-surfactant, a rheology modifier, a polymeric friction reducer, a surfactant friction reducer, a polymeric drag reduction enhancer, a monomeric drag reduction enhancer, an aqueous brine, or the like, or a combination or mixture thereof. In other embodiments of the invention, the slurry of degradable material plug is viscosified with and/or placed by a high viscosity polymer based fluid (such as a polysaccharide, such as guar or a guar derivative, linear or crosslinked); or a low viscosity polymer based fluid (for example a polyacrylamide); or a high viscosity surfactant based fluid (such as by example a VES based fluid system, or a VES plus a hydrophobically modified polymer, or a VES plus a rheology modifier); or a low viscosity polymer friction reducer based fluid, or a low viscosity surfactant based friction reducer fluid (such as by example a surfactant friction reducer plus a polymeric drag reduction enhancer, and/or a monomeric drag reduction enhancer) and combinations thereof. VES containing systems are preferred.

In a particular embodiment, the present invention can provide a DMAD fracturing method that can include the steps of: (a) injecting well treatment fluid into a well penetrating a multilayer formation to propagate a hydraulic fracture in a layer of the formation; (b) injecting an aqueous slurry comprising fibers of an insoluble, degradable material in a solids phase to form a plug of the consolidated fibers and isolate the hydraulic fracture from the wellbore, wherein the degradable material is present in the slurry at a concentration of at least 4.8 g/L (40 lbm/1,000 gal), and wherein a fluid phase of the slurry comprises a viscoelastic surfactant, a co-surfactant, a rheology modifier, a polymer friction reducer, a surfactant friction reducer, a polymeric drag reduction enhancer, a monomeric drag reduction enhancer an aqueous brine, or a combination or mixture thereof, (c) with the plug diverting from the previous hydraulic fracture, injecting well treatment fluid into the well to propagate a subsequent hydraulic fracture in another layer of the formation; and (d) thereafter degrading the degradable material to remove the plug. The well treatment fluid in step (a) can include in various embodiments, a polymer friction reducer, or a low viscosity surfactant based friction reducer, a viscoelastic surfactant, a co-surfactant, a rheology modifier, an aqueous brine, or a combination or mixture thereof, preferably the fluid includes a friction reducing formulation.

In one embodiment, the DMAD fracturing method can also include sequentially repeating steps (b) and (c) one or a plurality of times for diversion from the previous hydraulic fractures and propagation of subsequent hydraulic fracture(s) in other layer(s), wherein the plugs are thereafter removed in step (d) by degrading the degradable material.

In an embodiment, a well treatment fluid passageway in the wellbore can be maintained open between the formation layers for the subsequent hydraulic fracturing, wherein the previous fracture is isolated from the wellbore by the plug, e.g. without using bridge or sand plugs or other isolation device in the wellbore. In an embodiment, the DMAD fracturing method can include perforation in advance of the fracture propagation in steps (a) and (c).

In an embodiment, the slurry injection can be as a tail stage of the hydraulic fracturing. The fibers can bridge with inert proppants in the fracture to form the plug in one embodiment, and the plug can be formed by screenout of the slurry in another embodiment.

The DMAD fracturing method can include maintaining a pressure in the wellbore adjacent the plug that is above the formation pressure of the isolated fracture. The treatment may be done such that the wellbore between the plug and the wellhead is filled with fluid and the hydrostatic pressure on the wellbore side of the plug is greater than on the other side of the plug.

In an embodiment, the removal of the plug can be assisted by a wash. In one embodiment, any un-degraded material is produced with produced fluid without any need to assist in its removal.

Modeling techniques known in the art may be used with embodiments of the invention to optimize the parameters for the well treatment methods. For example, modeling may be used to determine the duration needed for the operation to be performed, and the degradable material, its concentration, and pumping rate are then selected accordingly. The main limitation of induced stress diversion (ISD) is that the induced stress field is limited in the amount of stress it can create, typically on the order of 3.44 MPa (500 psi) or so. If the fracture pressures of the zones are greater than about 3.44 MPa (500 psi), the differential stress created will not be enough to prevent the original fracture from taking subsequent injections.

In another aspect, the invention provides a well treatment fluid for DMAD treatment of a well that can be an aqueous slurry. The slurry can include an insoluble degradable material as described above, wherein the degradable material is in fiber form, comprises a polymer of monomer-derived units selected from the group consisting of esters, aromatic acids, amides and combinations thereof, and is present in the slurry at a concentration of at least 4.8 g/L (40 lbm/1,000 gal). The slurry can also include a particulate material, preferably having a distribution of sizes, and a fluid phase of the slurry can include a viscoelastic surfactant, a co-surfactant, a rheology modifier, a polymeric drag reduction enhancer, a monomeric drag reduction enhancer an aqueous brine, or the like, or a combination or mixture thereof. The particulate material can be a degradable material in one embodiment, or proppant in another embodiment.

In a further aspect, the invention can provide a DMAD composition that can include a removable plug formed in a well by screenout in a perforation, fracture, wellbore or combination thereof of a well treatment fluid comprising an aqueous slurry of an insoluble degradable material in fiber form and a particulate material having a distribution of sizes, as described above.

DETAILED DESCRIPTION

Figure 1:
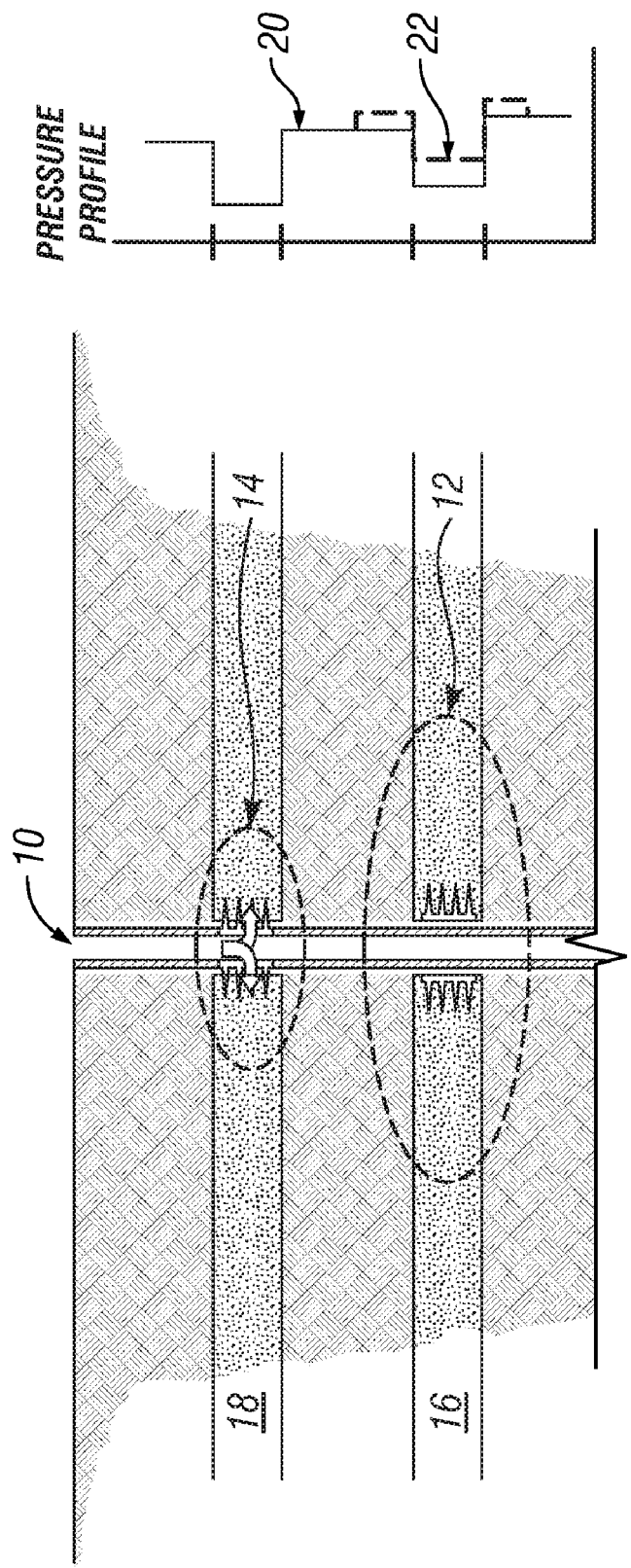
FIG. 1 shows a schematic illustrating a pressure profile corresponding to an induced stress diversion (ISD) technique, as used in the prior art.

Embodiments of the invention relate to methods for temporarily blocking wellbores, perforations, or formation fractures so that other work (e.g., fracturing of other zones, workover, well repair, installation of downhole equipment, etc.) can be performed more efficiently or without damaging existing fractures. The temporary blocking is achieved by consolidating solids including degradable materials that will degrade within a desired period of time. As applied in fracturing, the techniques of the invention are similar to the induced stress diversion technique (ISDT) that is currently used for wells located on land in North America.

The degradable materials may be in any shape: for example, powder, particulates, beads, chips, or fibers. Preferred embodiments may use these materials in the form of fibers. The fibers may have a length of about 2 to about 25 mm, preferably about 3 to about 18 mm. Typically, the fibers have a linear mass density of about 0.111 dtex to about 22.2 dtex (about 0.1 to about 20 denier), preferably about 0.167 to about 6.67 dtex (about 0.15 to about 6 denier). The fibers preferably degrade under downhole conditions, which may include temperatures as high as 180° C. (about 350° F.) or more and pressures as high as 137.9 MPa (20,000 psi) or more, in a duration that is suitable for the selected operation, from a minimum duration of 0.5, 1, 2 or 3 hours up to a maximum of 24, 12, 10, 8 or 6 hours, or a range from any minimum duration to any maximum duration. Although it is normally not necessary, the degradation may be assisted or accelerated by a wash containing an appropriate dissolver or one that changes the pH and/or salinity. The degradation may also be assisted by an increase in temperature, for example when the treatment is performed before steam flooding. Herein, when we use the term degradable, we include all of these suitably dissolvable materials.

The degradable materials may be sensitive to the environment, so there may be dilution and precipitation issues. The degradable material used as a sealer preferably should survive in the formation or wellbore for a sufficiently long duration (e.g., 3-6 hours). The duration should be long enough for wireline services to perforate the next pay sand, subsequent fracturing treatment(s) to be completed, and the fracture to close on the proppant before it completely settles, providing the best fracture conductivity. In tight gas formations with low leakoff, the duration of the plug may be a critical issue.

It must also be considered that degradable material sealers can inhibit flowback, and as a result, the fracture can be supercharged for a much longer period, which can benefit diversion. However, in low leakoff formations, care should be taken that the shut-in time may become too long, which may result in proppant settling. In this case, flowback after the degradable material is broken may be used to aid in suspending the proppant in the fracture. Thus, a compromise between these two considerations should be made. In accordance with embodiments of the invention, the chemical lifetimes in the wellbore and the fracture preferably are not shorter than 2-3 hours. On the other hand, their lifetimes preferably do not exceed a certain limit to allow one to flow back formations with extremely low leakoff. This indicates that an appropriate selection of the sealer type and additives is important.

Various degradable materials are used with embodiments of the invention. Such materials could theoretically include inorganic fibers, for example of limestone or glass, but are preferably polymers or co-polymers of monomer-derived units such as esters, amides, or other similar materials. As used herein, polymers may be referred to in terms of either the monomers or the as-reacted form of the monomers, and it is understood that reference to the monomer is construed in the specification and claims as to the polymerized form of the derivative resulting from the polymerization of the monomer.

The degradable polymers may be partially hydrolyzed at non-backbone locations. Examples include polyhdroxyalkanoates, polyamides, polycaprolactones, polyhydroxybutyrates, polyethyleneterephthalates, polybutyleneterephthalates, polyethylenenaphthalenates, polyvinyl alcohols, polyvinyl acetate, partially hydrolyzed polyvinyl acetate, and copolymers of these materials. Polymers or co-polymers of esters, for example, include substituted and unsubstituted lactide, glycolide, polylactic acid, and polyglycolic acid. Polymers or co-polymers of amides, for example, may include polyacrylamides, polyamides such as Nylon 6,6; Nylon 6; KEVLAR, and others.

Materials that dissolve at the appropriate time under the encountered conditions are also used, for example polyols containing three or more hydroxyl groups. Polyols useful in the present invention are polymeric polyols solubilizable upon heating, desalination or a combination thereof, and consist essentially of hydroxyl-substituted carbon atoms in a polymer chain spaced from adjacent hydroxyl-substituted carbon atoms by at least one carbon atom in the polymer chain. In other words, the useful polyols are preferably essentially free of adjacent hydroxyl substituents. In one embodiment, the polyols have a weight average molecular weight greater than 5000 up to 500,000 or more, and from 10,000 to 200,000 in another embodiment. The polyols may if desired be hydrophobically modified to further inhibit or delay solubilization, e.g. by including hydrocarbyl substituents such as alkyl, aryl, alkaryl or aralkyl moieties and/or side chains having from 2 to 30 carbon atoms. The polyols may also be modified to include carboxylic acid, thiol, paraffin, silane, sulfuric acid, acetoacetylate, polyethylene oxide, quaternary amine, or cationic monomers. In one embodiment, the polyol is a substituted or unsubstituted polyvinyl alcohol that can be prepared by at least partial hydrolysis of a precursor polyvinyl material with ester substituents.

Figure 2:
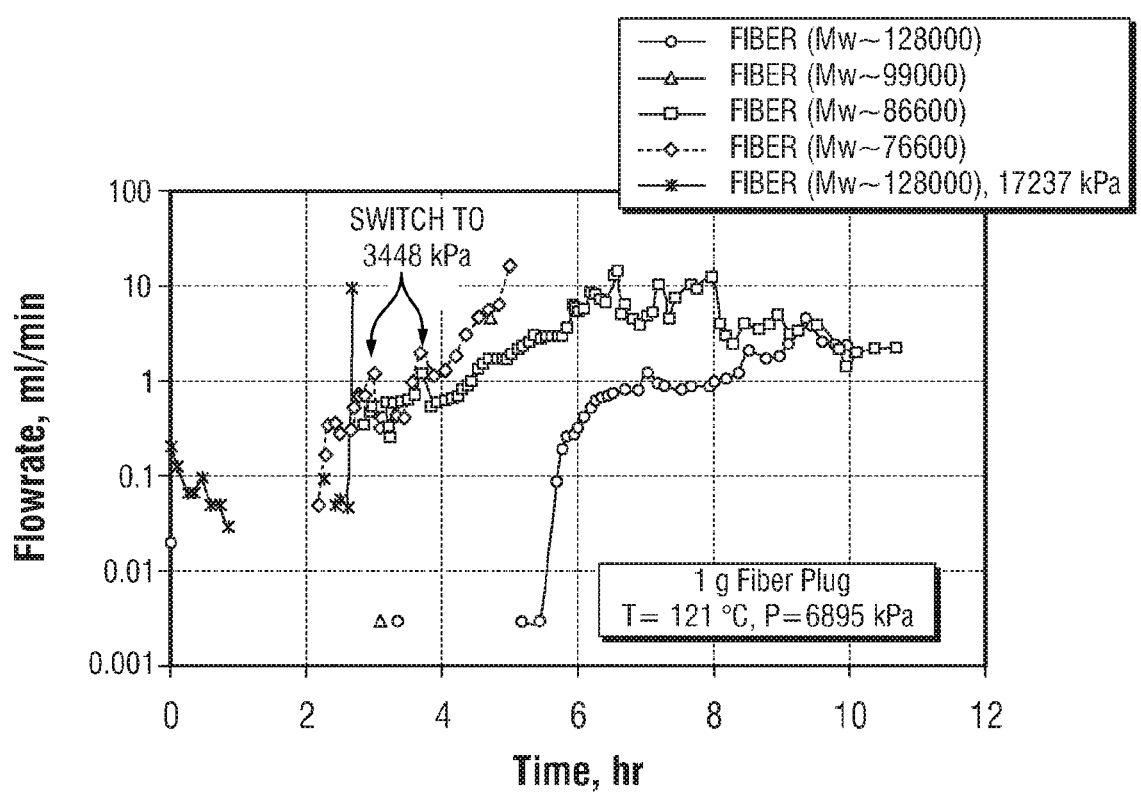
FIG. 2 shows a chart illustrating the decomposition of plugs made of polylactic acid fibers having different weight average molecular weights (Mw) as evidenced by a rapid increase of flow through the plugs, at 121° C. (250° F.) and at 6.89 and 17.24 MPa (1000 and 2500 psi), in accordance with one embodiment of the invention.

A number of laboratory experiments on the generation and testing of fiber plugs have been performed. The testing showed that plugs of 1 cm diameter and 2 cm long can withstand 17.2 MPa (2500 psi) of pressure for 2-4 hours at 121° C. (250° F.), depending on the plug composition. FIG. 2 shows lifetimes of fiber plugs made of polylactic acids (PLA) having different molecular weights. The higher molecular weight fiber plugs have longer lifetimes under the testing conditions, 121° C. (250° F.) and 6.9 MPa (1000 psi). For example, the plug having a polymer with a molecular weight of 77,600 has a lifetime of several hours, while plugs made of higher molecular weight polymers have longer lifetimes (up to 6 hours).

In accordance with some embodiments of the invention, different types of chemicals may be pumped to accelerate or delay degradable material decomposition (see above). Examples of delay agents may include any type of hydrophobic material (for example, kerosene, oil, diesel, polymers, surfactants, etc), which will cover the surfaces of the degradable materials to slow their interactions with water. For polyols, for example, such as partially hydrolyzed polyvinyl acetate, for example, salts may be included in the fluid; high ionic strength decreases the solubility of such materials. Examples of accelerator agents may include any high or low pH liquids (for example caustic or acid solutions), which will accelerate the decomposition of the degradable materials.

For example, for PLA polymers, the main degradation mechanism is hydrolysis. By adding a hydrophobic agent to the polymer (or plug), for example as a coating, the rates of hydrolysis will be reduced. As a result, the lifetimes of the polymers (hence, the lifetimes of the plugs) will be increased, as shown in a study of the decomposition of plugs made of polylactic acid having a molecular weight of ~128,000, in which there was a rapid increase of flow through the plugs in the presence of kerosene at 121° C. (250° F.) at 6.89 and 17.24 MPa (1000 and 2500 psi). Therefore, it is possible to control the lifetimes of plugs to suit the purposes of the operations.

The degradable materials are typically used at high concentrations, e.g., greater than 4.8, 6.0 or 7.2 g/L (40, 50 or 60 $lb_m$/1,000 gal), to form temporary plugs or bridges. The lower concentrations can be used if the fiber slurry can lose water, which concentrates the fibers. The maximum concentrations of these materials that can be used may be limited by the surface equipment available for addition and blending.

Some embodiments of the invention use degradable fiber plugs as described above. Other embodiments of the invention use plugs that are formed of degradable fibers and another material, such as inert proppants (including sand), or degradable absorbents (such as polyacrylic acid-co-acrylamide). The inclusion of an absorbent material may help fill pores inside a plug and make it stronger.

Figure 3:
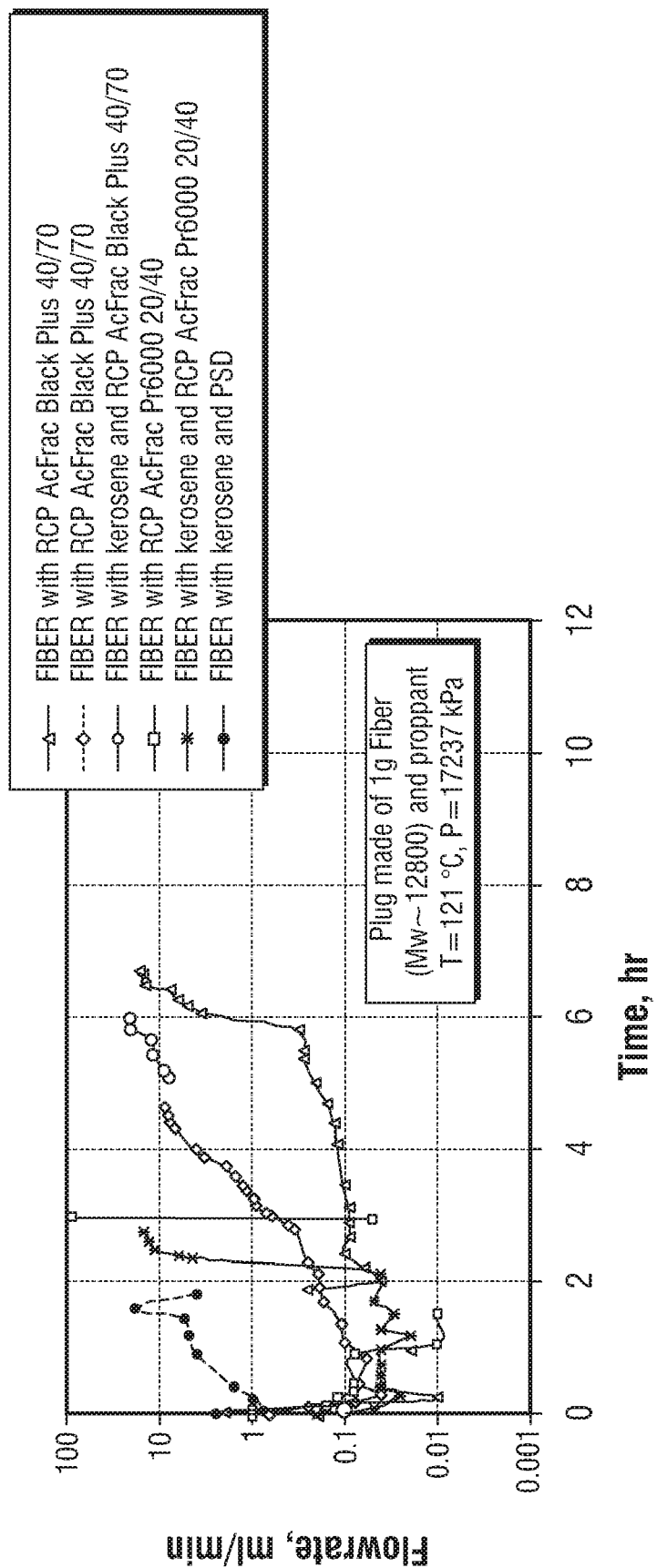
FIG. 3 shows a chart illustrating the decomposition of plugs made of degradable materials and proppant, as evidenced by a rapid increase of flow through the plugs, in the presence of kerosene at 121° C. (250° F.) and 17.24 MPa (2500 psi), in accordance with one embodiment of the invention.

The use of appropriate resin coated proppants (RCP) or small grain size non-RCP proppants gives quite satisfactory results: RCP/fiber plugs are able to withstand a pressure differential of 17.2 MPa (2500 psi) at 121° C. (250° F.) for several hours, as shown in FIG. 3. PLA fibers, pretreated or un-pretreated with kerosene, and blended with RCP obtained under the trade designations ACFRAC BLACK PLUS (40/70 mesh) and ACFRAC Pr6000 (20/40 mesh) were suitable. Also, PLA fiber with proppant having a multimodal particle size distribution (PSD) was a suitable mix.

In accordance with some embodiments of the invention, degradable materials are used in combination with methods of increasing the solid content of a slurry using particle-size distribution technology. With a properly chosen multi-modal distribution of particle sizes, smaller particles fill the void spaces between larger ones, resulting in a slurry requiring less water. Typical distributions use two or three distinct particle size ranges. This provides a slurry with improved flow properties and excellent set properties such as permeability and strength. Thus, some embodiments of the invention use proppants of different sizes instead of RCP's. With these embodiments, the proppant compositions may be optimized to achieve sufficient conductivity of the plugs after the fibers are degraded.

With this approach (i.e., multi-modal particle size distribution), various combinations of temporary perforation sealers can be achieved with excellent properties. Because degradable or dissolvable materials, such as a polylactic acid fiber, may be selected to be compatible with formation fluids and their downhole lifetimes can be easily varied (e.g., by adding delay agents to increase their lifetimes), this approach is very attractive in the DMAD technique.

One of ordinary skill in the art can appreciate that various acid fracturing methods may be used with embodiments of the invention, including methods of generating acid downhole (using an emulsified acid, encapsulated acid, or solid acid precursor). For example, U.S. Pat. No. 7,166,560 to Still discloses the use of solid acid precursors to provide controlled release of acid by hydrolysis or dissolution. The solid acid precursor may be lactide, glycolide, polylactic acid, polyglycolic acid, a copolymer of polyacetic acid and polyglycolic acid, a copolymer of glycolic acid with other hydroxyl-, carboxylic acid-, or hydroxycarboxylic acid-containing moieties, a copolymer of lactic acid with other hydroxyl-, carboxylic acid-, or hydroxycarboxylic acid-containing moieties, or mixture of the preceding. The solid acid may be mixed with a second solid that reacts with an acid to increase the rate of dissolution and hydrolysis of the solid acid precursor.

Furthermore, embodiments of the invention may also be used to temporarily plug the fractures or wellbore in order to achieve the desired effects or to perform other work. For example, methods of the invention may be used to temporarily shut in the well after fracturing so that the fractures can relax. For such a purpose, the duration is typically short, about 0.5 hour, for example. One can select a proper degradable material to achieve the desired duration. The degradable plugs in accordance with embodiments of the invention may also be used as "kill pills" to temporarily plug perforations or fractures, for example, 0.32 m³ (2 bbl) of water containing 2% VES (for example the concentrate plus additive described below in the Examples) plus 9.6 g/L (80 lb$_m$/1,000 gal) of, for example, polylactic acid fiber, plus 9.6 g/L (80 lb$_m$/1,000 gal) of, for example, polylactic acid beads or pellets, for example 18-40 mesh. This is effectively a VES-based carrier fluid (completely non-damaging) for a completely dissolvable fiber-based leak-off control pill.

In accordance with embodiments of the invention, degradable materials are preferably compatible with different pH fracturing fluids and with brines containing different concentrations of salts (such as sodium chloride NaCl, calcium chloride CaCl$_2$, sodium bromide NaBr, potassium chloride KCl, and others). The degradable materials should be compatible with temperature ranges as wide as possible. It is preferred that the degradable materials are compatible with temperatures greater than 0° C. (32° F.). Degradable materials should be compatible with weighted brines or completion fluids as well.

The use of surfactant based fluids is recommended because appropriate VES fluids can provide a high zero shear viscosity and more effective proppant and fiber placement, and cause less damage than polymer based fluids. Furthermore, when a VES fluid system is used to deliver the degradable material plug for diversion, and when a surfactant fluid system is also used for friction reduction in, for example, slickwater fracturing, then after the degradable material plug degradation, there is no polymer remaining in the system to cause damage such as might hinder fluid flow from the formation.

While the description herein uses hydraulic fracturing to illustrate embodiments of the invention, one of ordinary skill in the art would appreciate that methods of the invention may be used in traditional propped fracturing treatments independent of the method of viscosifying the fluid selected to provide the proppant and fiber carrying capacity. Polymer based or surfactant based fluid may be used and the methods and compositions of the invention may be used in other types of fracturing, including slickwater (or waterfrac) and acid fracturing.

Of particular interest is the case where the fluid pumped is a slickwater treatment, where the polymer concentration is reduced to a minimum required to provide high rate pumping with minimal friction losses. In this case the polymer-caused damage is minimized or non-existent, but in return the pumped proppant concentration is also reduced. In one embodiment of the invention, the degradable materials are pumped in the later stages of the slickwater treatment. In this case the use of a viscoelastic surfactant fluid provides much better proppant transport characteristics, while still remaining a virtually or completely polymer free treatment, which ensures that the region near the wellbore can be completed with high proppant concentration, and as a result is well connected.

Suitable high molecular weight polymer based slick water fluids include polymer friction reducers such as those described in Root, U.S. Pat. No. 3,254,719 or Phillips, & Hunter. U.S. Pat. No. 4,152,274, which describe fluids with low friction pressures, for well service applications like fracturing, linear (non crosslinked) natural polysaccharides such as guar and similar galactomannans, and derivatives thereof, such as hydroxypropyl guar, carboxymethyl hydroxypropylguar, or other heteropolysaccharides such as gellan gum, diutan gum, rhamsan gum and derivatives thereof described in U.S. Ser. No. 11/835,891, Aug. 8, 2007 which describes fluids with low friction pressures, for well service applications In another embodiment of the invention the fracturing treatment is achieved by pumping a polymer free, surfactant based slickwater treatment, where the surfactant is used at low concentration as a friction reducer, while still providing better proppant carrying properties than equivalent polymer based drag reducing polymer fluids. The surfactant type and concentration can be changed in the later stages to ensure a better placement of the proppant and the degradable material near the perforation channels. This treatment enables a completely polymer free fracturing, and allows for higher proppant concentration to be placed not only in the near wellbore region, but throughout in the fracture. As a result a much cleaner fracture is obtained, where no filter cake formation is possible at any stage of the treatment in the fracture faces.

Suitable slickwater fluids include polymer free fluids such as those described in U.S. Ser. No. 11/833,449, Aug. 3, 2007, which describes fluids with low friction pressures, for well service applications like stimulation (such as fracturing) well clean-out, and others, and methods for their use. In particular, it describes surfactant based fluids and methods for their use for stimulation, well clean-out, and other applications comprising a surfactant, a low molecular weight polymer, and optionally a counterion. The fluids exhibit outstanding improved viscous and solid suspending characteristics, over similar fluids reported in the prior art, at low surfactant concentrations (preferably less than about 0.5 weight percent).

The fluid of U.S. Ser. No. 11/833,449, Aug. 3, 2007, is called a suspending friction reducer (SFR). The SFR fluids comprise a drag reducing surfactant and a drag reduction enhancer mixture that can contain a polymeric drag reducing enhancer, and or a monomeric drag reduction enhancer. Suitable surfactants for use as the drag reducing surfactants of the invention include cationic surfactant molecules, e.g., those having the formula $R_1R_2R_3R_4N^{(+)}X^{(-)}$, and amphoteric surfactant molecules of formula $R_1R_2R_3R_4N$, where (A) $R_1$ is selected from: (1) a hydrocarbon chain, saturated aliphatic, monounsaturated, di-unsaturated or polyunsaturated comprising 8 to 24 carbon atoms, ($C_8$ to $C_{24}$), and most preferably $C_{14}$ to $C_{18}$; such as for instance hexadecyl —$(CH_2)_{15}$—$CH_3$; and (2) a functionalized hydrocarbon chain of structure $R_1=R_5$—Y—$R_6$ where Y is a functional group such as —O— (ether), —NH— (amine), —COO— (ester)-CNH— (amide), —[O—$(CH_2)_2]_xO$— (polyethylenoxide), —[O—$CH_2CH(CH_3)]_xO$— (polypropylenoxide), $R_5$ is hydrocarbon chain, saturated aliphatic, monounsaturated, diunsaturated or polyunsaturated comprising 8 to 24 carbon atoms, ($C_8$ to $C_{24}$), and most preferably $C_{14}$ to $C_{22}$, and $R_6$ is a hydrocarbon chain, $C_1$-$C_6$, more preferably —$CH_2CH_2$—, or —$CH_2CH_2CH_2$—; (B) $R_2$ and $R_3$ are selected from: (1) a hydrocarbon chain of 1 to 24 carbon atoms, preferably methyl, —$CH_3$; (2) a 2-hydroxyethyl chain (—$CH_2$—$CH_2$—OH); and (3) a hydroxy terminated polyethylene oxide chain of respective lengths x and y, for $R_2$ and $R_3$ respectively, selected such that x+y<20, 1<x<19 and 1<y<19, (—[$CH_2$—$CH_2$—O]$_n$—H); (C) $R_4$ is selected from: (1) a saturated hydrocarbon chain of 1 to 22 carbon atoms, preferably methyl, —$CH_3$; (2) a 2-hydroxyethyl chain (—$CH_2$—$CH_2$—OH); (3) a hydrogen atom, —H; and (4) for amphoteric (mainly amine oxide) surfactants, an oxygen atom or nitrogen atom, where the surfactant does not carry a positive charge, and therefore an anion $X^{(-)}$ is not present in the structure; and (D) for cationic surfactants, $X^{(-)}$ is an anion such as $F^{(-)}$, $Cl^{(-)}$, $Br^{(-)}$, $I^{(-)}$, $NO_3^{(-)}$, $SO_3H^{(-)}$, $SO_4H^{(-)}$, $CH_3COO^{(-)}$ (acetate), $CH_3SO_3^{(-)}$ (methanesulfonate), $CF_3SO_3^{(-)}$ (fluoromethanesulfonate), HO—CO—$C_6H_4$—$COO^{(-)}$ (monobasic phthalate), $CH_3OSO_3^{(-)}$ (methanesulfate), HO—$C_6H_4COO(-)$ (salicylate), $CH_3C_6H_4SO_3^{(-)}$ (toluenesulfonate), HO—$CH_2COO^{(-)}$ (glycolate), HO—$CH(CH_3)COO^{(-)}$ (lactate), and other monovalent anions.

Useful surfactants also include zwitterionic surfactants having the general formula $R_1N^{(+)}R_2R_3R_4X^{(-)}$, where (A) $R_1$ is selected from: (1) a hydrocarbon chain, saturated aliphatic, monounsaturated, diunsaturated or polyunsaturated comprising 8 to 24 carbon atoms, ($C_8$ to $C_{24}$), and more preferably $C_{14}$ to $C_{22}$; such as hexadecyl —$(CH_2)_{15}$—$CH_3$; and (2) a functionalized hydrocarbon chain of structure $R_1=R_5YR_6$ where Y is a functional group such as —O— (ether), —NH— (amine), —COO— (ester) —CNH— (amide), —[O—$(CH_2)_2]_xO$— (polyethylenoxide), —[O—$CH_2CH(CH_3)]_xO$— (polypropylenoxide), $R_5$ is a hydrocarbon chain, saturated aliphatic, monounsaturated, di-unsaturated or polyunsaturated comprising 8 to 24 carbon atoms, ($C_8$ to $C_{24}$), and more preferably $C_{14}$ to $C_{22}$, and $R_6$ is a hydrocarbon chain, $C_1$-$C_6$, more preferably —$CH_2CH_2$—, or —$CH_2CH_2CH_2$—; (B) $R_2$ and $R_3$ are hydrocarbon chains of 1 to 24 carbon atoms, preferably methyl, —$CH_3$; (C) $R_4$ is an alkyl chain $C_1$ to $C_6$, more preferably —$CH_2$—, or —$CH_2CH_2$—; and (D) $X^{(-)}$ is carboxylate —$COO^{(-)}$ for betaines or sulfonate group, —$SO_3^{(-)}$ for sultaines.

Useful surfactants also include anionic surfactants of formula $R_1X^{(-)}M^{(+)}$, where (A) $R_1$ is selected from (1) a hydrocarbon chain, saturated aliphatic, monounsaturated, diunsaturated or polyunsaturated comprising 8 to 24 carbon atoms, ($C_8$-$C_{24}$), or an monosubstituted phenyl group (such as nonylphenyl, —$C_9H_{19}C_6H_4$, or octylphenyl, —$C_8H_{17}C_6H_4$) and (2) a functionalized hydrocarbon chain of structure $R_1=R_2Y$ where Y is a functional group such as —[O—$(CH_2)_2]_xO$— (polyethylenoxide), or —[O—$CH_2CH(CH_3)]_xO$— (polypropylenoxide), and $R_2$ is a hydrocarbon chain, saturated aliphatic, monounsaturated, diunsaturated or polyunsaturated comprising 8 to 24 carbon atoms, ($C_8$-$C_{24}$), or an monosubstituted phenyl group (such as nonylphenyl, —$C_9H_{19}C_6H_4$, or octylphenyl, —$C_8H_{17}C_6H_4$); (B) $X^{(-)}$ is a negatively charged group such as $COO^{(-)}$; or $SO_3^{(-)}$; and (C) $M^{(+)}$ is a monovalent cation (such as $Li^{(+)}$, $Na^{(+)}$, $K^{(+)}$, $Rb^{(+)}$, and $NH_4^{(+)}$).

Examples of surfactants that can be used in SFR fluids of the invention also include those amphoteric surfactants such as amine oxide surfactants having the general formula $R_1R_2R_3NO$, such as hexadecyl dimethyl amineoxide; tetradecyl dimethyl amineoxide; lauryl dimethyl amineoxide; octadecyl dimethyl amineoxide; and the like, for which some examples can be purchased under the trade names Aromox B-W 500, Aromox DMC, Aromox DM16, Aromox 14D-W 970, Aromox DMHT, Aromox T/12 DEG, Aromox APTA-T, and Aromox C/13W, all from AKZO.

Useful "polymeric drag reduction enhancers" include relatively low molecular weight polymers, which are not capable alone of providing any drag reducing activity in aqueous fluids, but when used in the presence of one or more drag reducing surfactant(s), they strongly enhance the performance of the surfactant, increase the drag reduction, increase the low shear rate fluid viscosity, and as a result provide better particle transport capability.

Useful examples for combination with cationic and zwitterionic drag reducing surfactants include polymers available under the trade designations Daxad® 16L and Daxad® 17. Daxad® 17 is a solid material which is a polycondensation product of sodium naphthalene sulfonate with formaldehyde, having a molecular weight of about 2000-3000 Da. Daxad® 16L is a 50% aqueous solution of Daxad® 17. Therefore, both products have the same molecular weight. Copolymers obtained by formaldehyde condensation of naphthalene sulfonate with other monomers such as phenol, alkylated phenols, bisphenols of various structures such as bisphenol F (formaldehyde), or bisphenol A (acetone), etc. may also be used, whether obtained by acid or by base catalysis. Copolymers obtained by melamine condensation of naphthalene sulfonate with other monomers such as phenol, alkylated phenols, bisphenols of various structures such as bisphenol F (formaldehyde), or bisphenol A (acetone), and the like, and lignosulfonates may also be used as polymeric drag reduction enhancers.

Other sulfonate-containing low molecular weight, non drag reducing polymers that can be used include vinyl benzene sulfonate and AMPS copolymers. Also useful are polycarbonates, epoxy resins and other polymers that have been functionalized with a sulfonate, carboxylate, phosphate or sulfate group to render them water soluble. The sulfonate group in any of the sulfonate polymer examples listed above, may be replaced by other anionic structures such as carboxylates, phosphates, or sulfates. The effect of the polymer bulkiness, the linear, or branched character of the polymer, the presence or absence and the degree of internal crosslinking, and the persistent length of the polymer will all have an effect on the drag reducing enhancement provided by the oligomer or polymer selected and should be tested according to the procedures described herein.

Also useful as polymeric drag reducing units are low molecular weight negatively charged polysaccharides such as carboxymethyl cellulose, carboxymethyl guar, carboxymethylhydropypropylguar and the like as well as low molecular weight, water soluble, maleic anhydride copolymers, such as available under the trade designation Daxad® 31, or sodium methacrylate polymers and copolymers such as available under the trade designation Daxad® 30, ammonium methacrylate polymers and copolymers such as available under the trade designation Daxad® 32, can also be used.

Other low molecular weight polymers that are not capable alone of providing any drag reducing activity in aqueous solutions, but which in the presence of one or more drag reducing zwitterionic or amphoteric surfactant(s), strongly enhance the surfactant's performance, increasing the drag reduction, increase the low shear rate fluid viscosity, and as a result provide better particle transport capability include non-ionic polymers such as partially hydrolyzed polyvinyl acetate copolymers, polyvinyl alcohol and copolymers, polyethylene oxide and copolymers, polypropylene oxide and copolymers. Particularly suitable examples of such polymers include a polyvinyl alcohol copolymer sold under the trade name Alcotex® WD100. Other examples of such polymers include those low molecular weight water soluble polyampholites containing both positive and negative charges, obtained by copolymerization of at least one cationic monomer and one anionic monomer, and optionally other charged or non charged monomers.

Useful monomeric drag reduction enhancers include certain uncharged organic compounds, such as urea and urea derivatives, and certain charged organic compounds (also called counterions) such as the salicylate ion, that can help enhance the drag reduction properties of a given surfactant either in the presence or absence of polymeric drag reduction enhancers. Urea, and urea derived compounds such as N,N dimethyl urea, N,N' dimethylurea, or N,N diethyl urea, and the like are useful as monomeric drag reduction enhancers in SFR fluids.

Organic ionic compounds such as sodium salicylate can also be used as monomeric drag reduction enhancers for a variety of drag reducing surfactants and surfactant mixtures. Other useful ionic compounds include sodium para-toluene sulfonate, sodium xylene sulfonate, sodium naphthalene sulfonate, sodium phthalate, sodium citrate, sodium EDTA, sodium methane sulfonate, sodium perfluoromethane sulfonate, sodium malonate, sodium fumarate, sodium adipate, etc. Other anions that may be used include chelating agents such as EDTA salts, chlorinated salicylates, alkylated salicylates, chlorinated phthalates, alkylated phthalates, alkyl sulfonates, alkyl sulfates, alkyl aryl sulfonates, alkyl aryl sulfates, ethoxylated alkyl sulfonates, ethoxylated alkyl sulfates, ethoxylated alkyl aryl sulfonates, or ethoxylated alkyl aryl sulfates. Salts of abietic acid (also known as abietinic acid or sylvic acid, $C_{19}H_{29}COOH$), may also be used, as may other similar materials, such as fulvic acid salts. Potassium or ammonium salts of these anions will be effective, as would other salts of simple cations.

A preferred embodiment of the invention is the use of a fluid, for delivering the degradable material plug, containing a viscoelastic surfactant selected from zwitterionic, amphoteric, and cationic surfactants and mixtures of those surfactants, and a rheology enhancer in a concentration sufficient to shorten the shear recovery time of the fluid, in which the rheology enhancer is selected from the group consisting of an amphiphilic polymer, for example a homopolymer or copolymer containing at least a portion consisting of partially hydrolyzed polyvinyl ester or partially hydrolyzed polyacrylate or sulfonate-containing polymers. The rheology enhancer may also increase the viscosity of the fluid.

In a more preferred embodiment the viscoelastic surfactant system may contain a zwitterionic surfactant, for example a surfactant or mixture of surfactants having the formula:

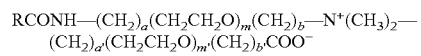

in which R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$. The zwitterionic surfactant may have the betaine structure:

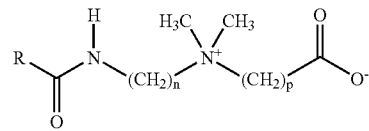

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. The betaine may be oleylamidopropyl betaine or erucylamidopropyl betaine and may contain a co-surfactant.

The viscoelastic surfactant system may contain a cationic surfactant, for example a surfactant or mixture of surfactants having the structure:

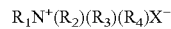

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds. As a further example, $R_1$ contains from about 18 to about 22 carbon atoms and may contain a carbonyl, an amide, or an amine; $R_2$, $R_3$, and $R_4$ contain from 1 to about 3 carbon atoms, and $X^-$ is a halide. As a further example, $R_1$ comprises from about 18 to about 22 carbon atoms and may comprise a carbonyl, an amide, or an amine, and $R_2$, $R_3$, and are the same as one another and comprise from 1 to about 3 carbon atoms. The cationic viscoelastic surfactant system optionally contains amines, alcohols, glycols, organic salts, chelating agents, solvents, mutual solvents, organic acids, organic acid salts, inorganic salts, oligomers, polymers, co-polymers, and mixtures of said materials, present at a concentration of between about 0.01 and about 10 percent, for example at a concentration of between about 0.01 and about 1 percent. The amphoteric surfactant may be, for example, an amine oxide, for example an amidoamine oxide.

The rheology enhancer can be present in the fluid at a concentration of from about 0.0005% to about 0.2%, for example at a concentration of from about 0.001% to about 0.05%. The rheology enhancer contains, as one example, a partially hydrolyzed polyvinyl acetate having a percent hydrolysis between about 10% and about 95%. The molecular weight is, for example, from about 500 to about 100,000,000. Other esters may be used, for example $C_2$ to $C_5$ esters (i.e. the partially hydrolyzed ethyl to pentyl esters of polyvinyl alcohol). As another example, the rheology enhancer contains partially hydrolyzed polyvinyl acetate having a percent hydrolysis between about 30% and about 88%, and the molecular weight is, for example, from about 500 to about 1,000,000,000.

The rheology enhancer may also contain partially hydrolyzed polyacrylates, or partially hydrolyzed polymethacrylates or the like, for example, but not limited to, partially hydrolyzed polymethyl acrylate, partially hydrolyzed polyethyl acrylate, partially hydrolyzed polybutyl acrylate, partially hydrolyzed polymethyl methacrylate, and mixtures of these polymers. The rheology enhancer may also contain sulfonate-containing polymers.

The amphiphilic polymer or copolymer rheology enhancer may be linear, branched, or have a comb, dendritic, brush, graft, star or star-branched shape. It may contain repeating units other than vinyl esters, vinyl acrylates, and the corresponding hydrolyzed groups. The other repeating units are, for example, polyethylene oxide/polyethylene glycol or polypropylene oxide/polypropylene glycol. The copolymers may be random, alternating, or block copolymers.

The method of the invention can be used in single stage or multiple stage treatments such as, by non-limiting examples: fracturing, matrix treatments, squeeze treatments, and water control treatments. The use of fiber diversion in any fluid may impact a wide range of applications. While methods of the invention may be used in fracturing, workover, or other types of operations, for clarity, the following description will use hydraulic fracturing as an example to illustrate embodiments of the invention. It will also be assumed, as an example, that sequential fracturing starts at the bottom of a vertical well, or the distal end of a horizontal well, and progresses towards the wellhead. Of course, other sequences are possible, depending upon the stress profile. One of ordinary skill in the art can appreciate that this is not intended to limit the scope of the invention to hydraulic fracturing. Instead, methods of the invention may also be used in other operations, such as temporary plugging of fractures or wellbores.

Some embodiments of the invention relate to temporarily blocking of already-created fractures so that other zones may be fractured. As applied to multi-stage fracturing, at the tail end of a fracturing treatment, a degradable or dissolvable material can be pumped to temporarily plug a completed fracture. The temporary plug locks the proppants in a fracture, making them immobile and causing substantial stress increase and diversion in lower zones by means of a significant net pressure increase due to the high likelihood of proppant bridging with the degradable materials. In accordance with an alternative method of the invention, a degradable material that can create a temporary packer is pumped after the proppant stages to temporarily seal the fracture by sealing the perforations. In another alternative, the plug is formed in the wellbore to seal the perforations leading to the fracture. In yet another embodiment, a plug is formed in more than one of these locations.

With this system, the fracture is protected and successive fracturing treatments, usually further up the hole, can be performed without the need for lengthy wireline intervention, as only perforation is required to initiate a subsequent fracturing treatment. The degradable material will dissolve with time and unplug the fracture. The degradable material may be of various properties, shapes and contents. The material decay or disintegration may be chemically, temperature or mechanically driven. These methods may be performed with any suitable equipment known in the art, including coiled tubing (CT) that has been installed in the wells for jetting new perforations. These methods of the invention are similar to the ISDT's that are currently used on land in North America. However, the degradable material assisted diversion (DMAD), in accordance with embodiments of the invention, can provide much higher and more reliable stress diversion.

In stress diversion multi-stage fracturing, the stress should exceed the breakdown pressure and the net pressure increase during the subsequent stages. Stress or pressure for diversion to subsequent fracturing stages may result from at least four mechanisms: (1) normal increases in stress with depth; (2) pipe friction; (3) temporary supercharge from fracturing (net pressure); and (4) increased stress on proppants. These can be distinguished from another mechanism of stress diversion that naturally occurs in any job using polymer as the viscosifier is concentration of the polymer gel due to fluid loss, but this will not be discussed further.

In-situ formation stress may arise from overburden stress, thermal stress, and tectonic strains. The common estimate for fracture pressure increase is 14 kPa/m (0.62 psi/ft). This suggests that identical rocks with normal pressure gradient have 4.27 MPa (620 psi) of diverting power per 304.8 m (1000 ft) of separation. However, in reality, fracture pressure distribution is not entirely homogeneous: it is usually a function of the lithology and of the pore pressure of the layers in question and does not vary linearly with depth. Therefore, additional energy often needs to be added to the system to ensure that the ISD technique would work consistently.

Friction pressure losses are pipe friction losses that occur primarily in tubulars (casing or tubing) from the surface until the fluid reaches the hydraulic fracture. The higher the pressure losses, the less pressure that is transmitted from either the surface or an injection point above a reference point. Thus, friction pressure can facilitate the success of the induced stress diversion technique by reducing the amount of pressure that might otherwise lead to re-fracturing previously fracture zones. However, even at high flow rates with high friction, the friction pressure diversion at best, e.g., for very viscous fluids, will not usually be higher than 22.6 kPa/m (1 psi/ft). A recent trend is to use low polymer loading for fracturing fluids. Such fracturing fluids will have low viscosity, and low pipe friction pressure. As a result, pipe friction pressure would not play an important role in a typical ISDT fracturing job. Note that with the limited entry technique, the limited number of perforations creates an artificial friction pressure, not due to the fluid, but rather due to the limited number of perforations.

Fracturing supercharge comes from the need to overcome the breakdown pressure to initiate the fracturing process. Breakdown pressures are typically 5-10% higher than the fracture extension pressure, which is about the same as the closure stress. Typical values for fracture differential gradients are 2.26–4.53 kPa/m (0.1-0.2 psi/ft) at a depth around 3048 m (10,000 ft). This implies that it is worthwhile to have considerable excess net pressure in the first (lower) fracture to overcome the breakdown pressure of the upper zone. However, to be useful, the supercharge pressure in the first fracture should not be released via flowback.

Figure 4:
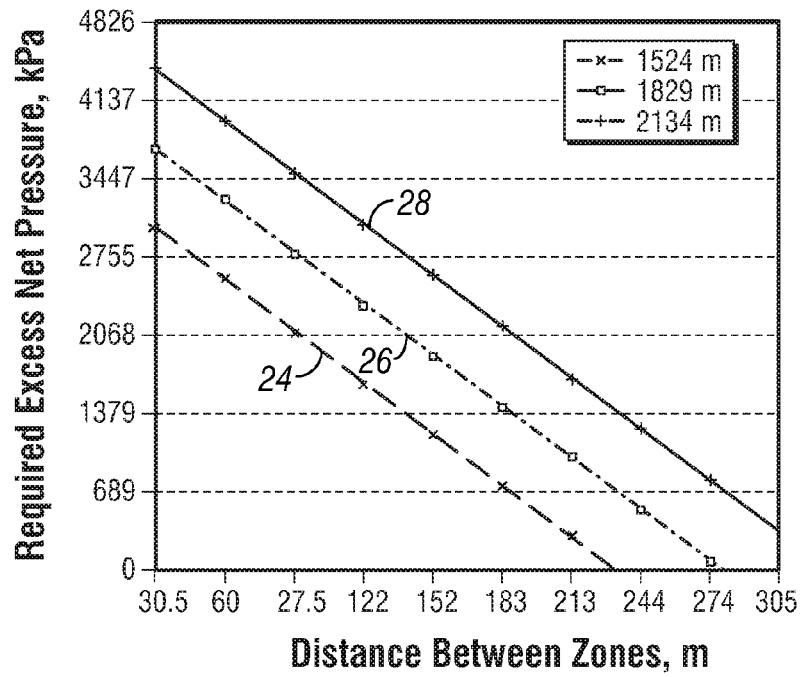
FIG. 4 shows a chart illustrating excess pressure needed to fracture a pay zone as a function of depth and spacing between pay zones.

FIG. 4 shows a chart of excess pressures typically required to fracture a formation at different depths, e.g., curve 24 for 1524 m (5000 ft); curve 26 for 1829 m (6000 ft); and curve 28 for 2134 m (7000 ft). In this chart, it is assumed that the fracture gradient is 14.7 kPa/m (0.65 psi/ft), whereas the breakdown pressure gradient is 17 kPa/m (0.75 psi/ft). It is evident from FIG. 2 that the deeper the pay zones are, the higher the required excess pressures are for a given spacing between pay sands. For instance, if the first fracture was generated at 2286 m (7500 ft) and the next at 2134 m (7000 ft), the required excess pressure in the first fracture is approximately 2551 kPa (370 psi) (see curve 28). In tight gas formations, the required excess pressure may be as high as 13.8 MPa (2,000 psi) at depths higher than 3048 m (10,000 ft). These data all assume identical lithology and pore pressures; variations in any of these could affect the curves.

Figure 5:
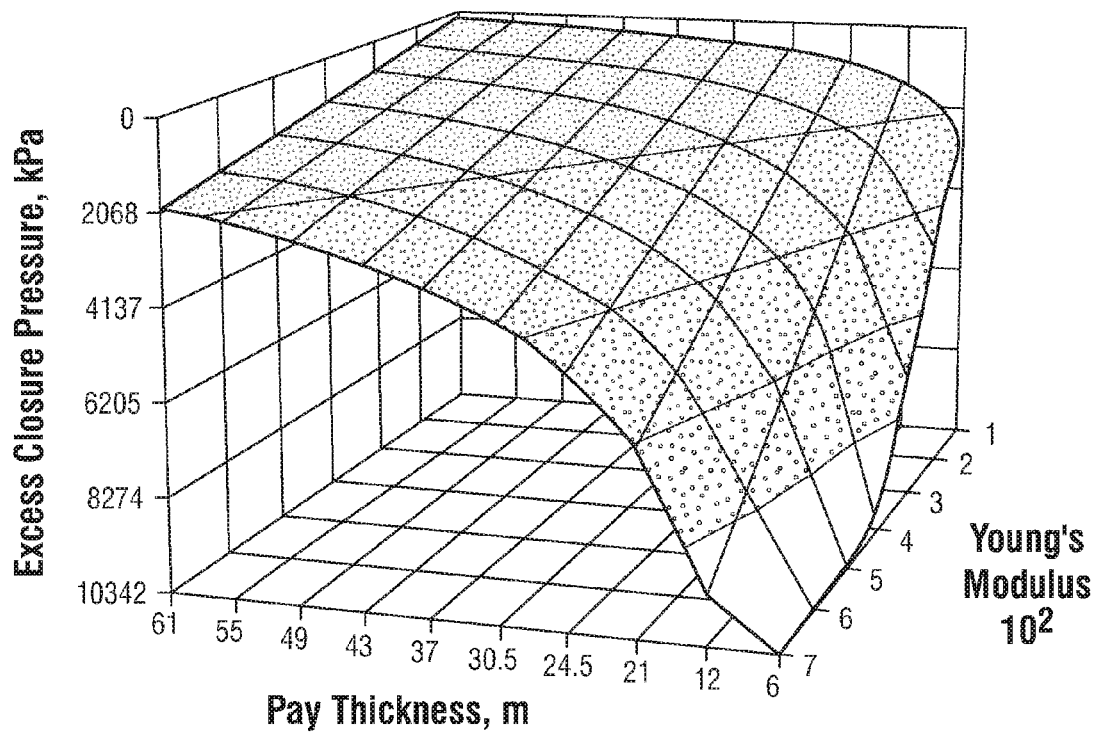
FIG. 5 shows a graph illustrating excess pressure for 10.34 MPa (1500 psi) in-situ stress differential between pay zone and shale.

When pumping stops after fracturing, the fractures will close on the proppant that has entered the fractures. Common industry practice for estimating closure stress on proppant is to subtract flowing bottomhole pressure from the estimated in-situ stress of the pay interval fractured. However, it has been shown that closure stress on proppant can be significantly higher than expected due to the influence of the bounding layers. See Schubarth et al., "*Understanding Proppant Closure Stress*," SPE 37489, SPE Production Operations Symposium, Oklahoma City, Okla., U.S.A., Mar. 9-11, 1997. Normally, a fracture does not propagate within the targeted sand bordering the lower and upper shales where the closure stress is higher. The stress differential between sand in the pay zone and sand at the boundaries may vary between 3.44 and 17.2 MPa (500 and 2500 psi). The thickness of a pay interval can vary from 6.1 to 61 m (20 to 200 ft). Based on these values, it has been shown that the excess closure pressure can vary from 2.1 MPa (300 psi) for a 61 m (200 ft) thick pay sand to 10.34 MPa (1500 psi) for a 6.1 m (20 ft) thick pay sand, assuming 10.34 MPa (1500 psi) in-situ pressure differential at the sand-shale boundaries, as seen in FIG. 5. The excess stress at the sand-shale boundaries may have a negative effect on the fracture conductivity, but it has a positive effect on stress diversion. It should be noted that this mechanism is largely independent of mechanisms 1-3 of the four mechanisms listed above, because fracture closure does not occur until the fracture supercharge has completely dissipated through leak-off or flowback. Therefore, this mechanism can be considered separate from the other three mechanisms.

The interplay between the first three diversion mechanisms may be understood better by analyzing them in formulas. First, let's assume that: (1) the first pay sand is fractured and has a temporary supercharge of $\Delta_1$ psi; (2) the supercharge in the first stage $\Delta_1$ is sufficient to divert the second stage; (3) there is a normal stress increase with depth of 14.7 kPa/m (0.65 psi/ft); and (4) the friction pressure of the fracturing fluid is 11.3 kPa/m (500 psi/1000 ft). With these assumptions, the governing equations can be written for the first and second zones, respectively, as:

$$p_S + p_{HS1} - P_{fr1} \leq \sigma_{min1} + \Delta_1 \tag{1}$$

$$p_S + p_{HS2} - P_{fr2} - \sigma_{min2} = \Delta_2 \tag{2}$$

where $p_S$ is the surface pressure, $p_{HSi}$ is the hydrostatic pressure for the ith zone, $p_{fri}$ is the i th friction pressure, $\sigma_{mini}$ is the i th in-situ stress, and $\Delta_2$ is the net pressure in the second zone.

If one substitutes Eq. (2) into Eq. (1), one obtains:

$$\Delta_2 - p_{HS2} + p_{fr2} + \sigma_{min2} + p_{HS1} - p_{fr1} \leq \sigma_{min1} + \Delta_1 \tag{3}$$

or $$\Delta_2 + \Delta p_{HS} \leq \Delta_1 + \Delta p_{fr} + \Delta\sigma_{min} \tag{4}$$

where $\Delta p$ denotes $p_1 - p_2$. The right-hand side of Eq. (4) describes the positive isolation mechanisms or induced stresses, while the left-hand part is the required excess pressure. With the assumptions listed above, $\Delta p_{HS}$=11.3 kPa/m (50 psi/100 ft), $\Delta p_{fr}$=11.3 kPa/m (50 psi/100 ft), and $\Delta\sigma_{min}$=14.7 kPa/m (65 psi/100 ft). Substituting these numbers into Eq. (4), one obtains for a spacing of 152.4 m (500 ft):

$$\Delta_1 \geq \Delta_2 - 325 \text{ psi } (2.24 \text{ kPa}) \tag{5}$$

Eq. (5) indicates that if the net pressure in the first fracture is fully released (due to flowback or leak-off), then there is an excessive pressure of 2.24 kPa (325 psi) to divert the next stage. In low permeable hard rocks, a typical value for the net pressure may vary between 6.9 and 13.8 MPa (1000 and 2000 psi). This means that the ISD margin of safety may easily be exceeded in the case of first stage flowback.

The above description illustrates that while ISD techniques may provide effective diversion in certain formations, these techniques may not work in other formations. Unfortunately, short of measuring the in-situ stress of every pay zone to be fractured, there is no reliable way to predict which formations are suitable for ISD techniques.

Embodiments of the invention provide diversion methods that are more reliable than conventional ISD by adding degradable materials to enhance the net stress of the pay zone that was just fractured. In accordance with embodiments of the invention, to achieve a greater net pressure in the first fracture, high concentrations of special degradable materials can be used at the tail ends of fracturing treatments. The degradable materials may be fibers, powders, or any other forms. Laboratory and field experiments have shown that at high concentrations of fibers, the proppant-fiber slurry may bridge. As a result, the job may screen out. This will lead to a significant increase in the net pressure and to good near-wellbore proppant placement. Such a procedure may be called a "tail screenout." Studies have also shown that fiber bridging is a complicated phenomenon, which requires special modeling to design such a job properly. U.S. Pat. No. 6,837,309 to Boney discloses methods and compositions designed to cause tip screenouts.

On the other hand, if the first fracture supercharge is gone (e.g., due to leak-off or flowback), the fourth mechanism of those listed above (i.e., the incremental stress on proppants) is activated. FIG. 3 shows that the incremental stress on proppants may successfully substitute for the surcharge pressures described above, if one fractures several thin pay zones simultaneously in the first stage of fracturing. The above description shows that in tight gas formations, there are two options to ensure sufficient stress for diversion: (a) maintain high net surcharge pressure in the first pay sand, i.e. prevent or minimize flowback; or (b) rely on the high incremental stress on proppant, i.e. immediate flowback after the first stage. The second option (relying on incremental stress on proppants) would be advantageous, if one fractures several thin pay zones with considerable in-situ stress differential between sands and shales.

The above description also shows that high degradable material concentrations at the tail end of a treatment may be used to: (a) sustain proppants, i.e. to reduce settling rate during and after treatments and to reduce proppant flowback; and (b) ensure larger net surcharge pressure in the preceding stages.

Furthermore, the above description also shows that appropriate designing and laboratory experiments are desirable to ensure that the DMAD techniques in accordance with embodiments of the invention work properly. In addition to design and laboratory experiments, modeling may also be used to design proper parameters for DMAD. Various formation modeling techniques are available for hydraulic fracturing, such as Schlumberger's FracCADE stimulator™ and the methods disclosed in U.S. Pat. No. 6,876,959. Other available software, for example, includes pseudo three-dimensional (P3D) hydraulic fracture simulators and planar three-dimensional (PL3D) hydraulic simulators (including GOHFER™ from Stim-Lab and Marathon Oil Co.). Embodiments of the invention are not limited to any particular modeling method.

In accordance with some embodiments of the invention, modeling is used to simulate induced stress diversion for the formation of interest. Then, the types and amounts of fluids to be used, and the durations and pumping rates for the fracturing job are accordingly selected. Embodiments of the invention provide efficient methods for diverting stress/pressures for staged fracturing. One of ordinary skill in the art would appreciate that these methods may be applied in any type of well, including vertical, deviated or horizontal wells, and open or cased hole.

Consider the degradable material sealer mechanisms in more detail. We assume that: (1) the first pay sand is fractured and has a temporary supercharge of $\Delta_1$ psi; (2) the sealing ability of the material is $p_{MS}$=6.9 MPa (1000 psi); (3) the induced stress is enough to divert the subsequent stage; (4) there is a normal stress increase with depth of 14.7 kPa/m (0.65 psi/ft); (5) fracturing fluid friction pressure is 11.3 kPa/m (500 psi/1000 ft); and (6) the hydrostatic pressure difference is 3.45 MPa (500 psi).

With these assumptions the governing inequality (4) can be rewritten as:

$$\Delta_2 + \Delta p_{HS} \leq \Delta_1 + \Delta p_{fr} + \Delta \sigma_{min} + p_{MS} \tag{6}$$

For stage spacing of 500 ft this will give $$\Delta 1 \geq \Delta 2 - 9.1 \text{ MPa (1325 psi)} \tag{7}$$

Taking into account that the sealer provides no flowback, i.e. most of supercharge $\Delta_1$ will stay in the first fracture, it becomes clear that the degradable material sealer may be an excellent diversion tool, providing excess pressure up to or higher than 13.8 MPa (2000 psi).

From the above description, it is apparent that good knowledge about formation and reservoir fluid properties is important to employ the DMAD techniques appropriately for multiple fracturing treatments. The following parameters are important ones to consider in optimizing a DMAD job: in-situ stress profile; in-situ stress differential between pay sand and shales; reservoir fluid composition and its compatibility with degradable material; and proppant sustaining in the fracture. Some of these parameters may be available from downhole measurements, while others may not be available. As noted above, embodiments of the invention may use a modeling technique to optimize the DMAD job. Any parameters not available may be optimized using a suitable modeling method known in the art.

As illustrated in the above description, embodiments of the invention use degradable materials to block a perforation, fracture, or wellbore temporarily so that work may be performed in other zones. In accordance with some embodiments of the invention, at the tail end of a fracturing treatment, a degradable material is pumped at a high concentration to temporarily plug a completed fracture, and to lock the proppant in a fracture making it immobile and causing substantial stress increase and diversion from lower zones by means of a significant net pressure increase due to a higher likelihood of proppant bridging. In accordance with some embodiments of the invention, a degradable material that can create a temporary packer is pumped after the proppant stages to temporarily seal the perforations associated with the fracture, or to temporarily seal the wellbore adjacent to these perforations. With this system, the fracture is protected and a subsequent fracturing treatment further up the hole may be performed without the need for lengthy wireline intervention, as only perforation is required to initiate a subsequent treatment.

Degradable materials will dissolve with time and unplug the fracture. The degradable materials may be of a variety of properties, shapes and compositions. The material decay or disintegration may be chemically, temperature or mechanically driven. Methods of the invention may be performed with any suitable equipment used in the industry, such as coiled tubing that is installed in the well ready to jet new perforations. While methods of the invention are conceptually similar to ISDT, the DMAD techniques of the invention guarantee much higher and more reliable stress diversion.

Figure 6:
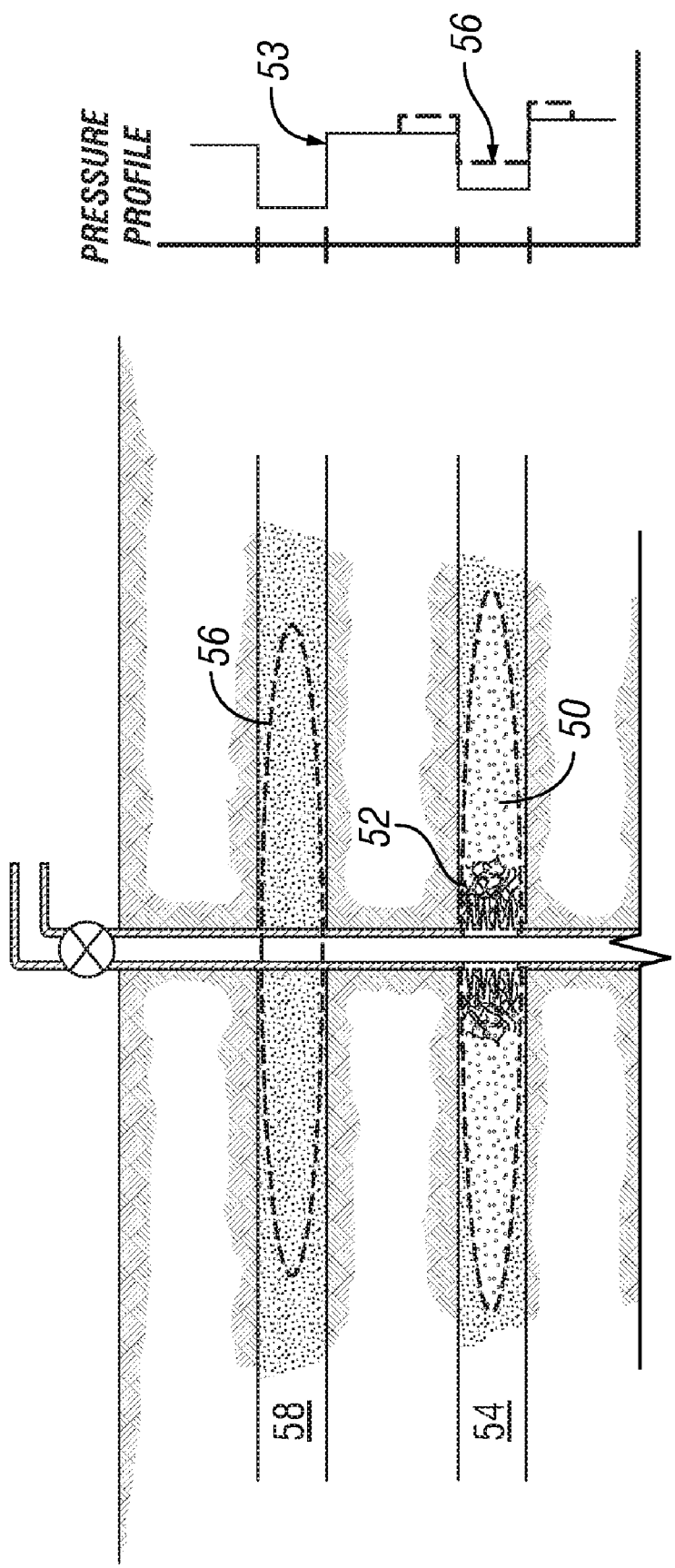
FIG. 6 shows a schematic illustrating a pressure profile corresponding to the bridging and blocking of proppant in a fracture in accordance with one embodiment of the invention.

FIG. 6 shows a schematic representation of a method in accordance with some embodiments of the invention. In accordance with this method, a degradable material/chemical is added at the tail end of the earlier proppant stage 50 to induce proppant bridging 52 with the initial stress profile 53. The addition of the material substantially increases the likelihood of proppant bridging in the fracture 50 created in the earlier pay zone 54. Once proppant bridging occurs, proppants are locked in the fractures, which prevents flowback and helps retain the supercharge stress 56 in pay zone 54 (shown as a dashed line pressure profile to the right). Proppant bridging may also induce a near-wellbore screen-out, which in turn can substantially increase the fracture supercharge in pay zone 54. The supercharge stress in pay zone 54 will divert the fracture fluids to help form a subsequent fracture 56 the next pay zone 58.

Figure 7A:
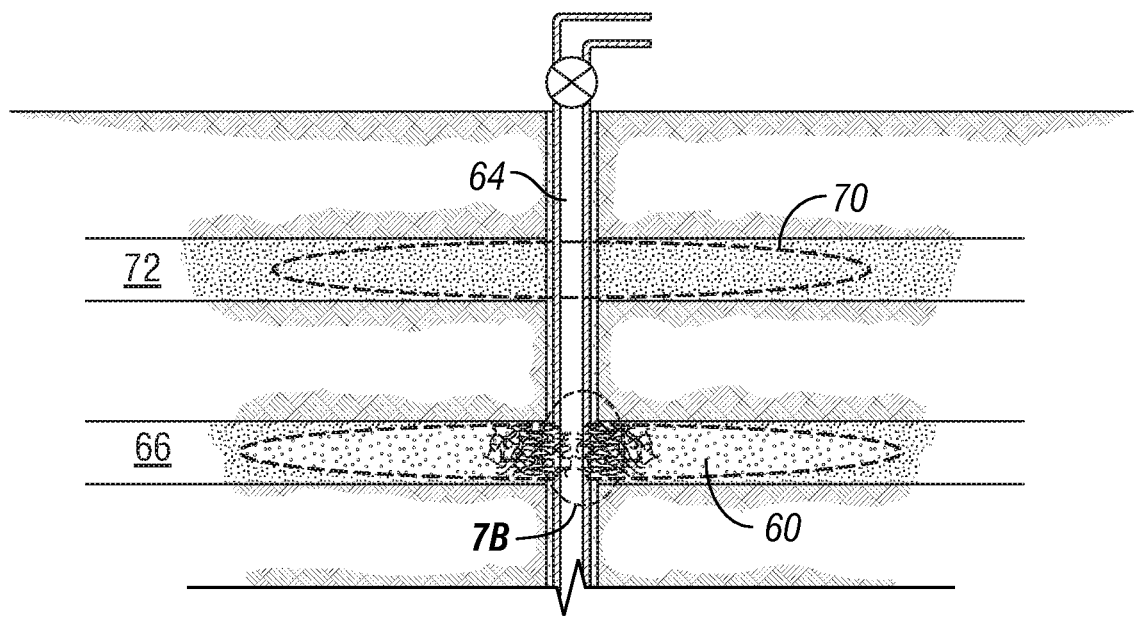
FIG. 7A shows a schematic illustrating plugging of a perforation in accordance with one embodiment of the invention.
Figure 7B:
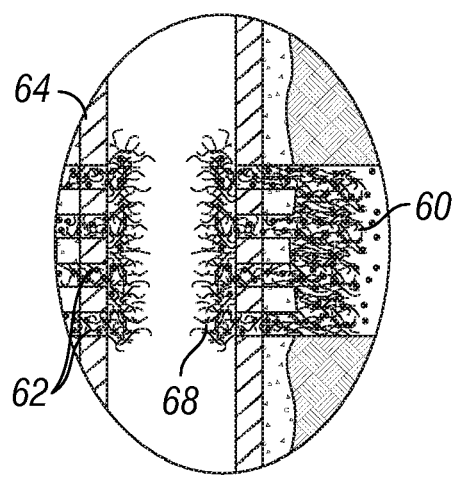
FIG. 7B shows an enlarged section of region 7B from FIG. 7A.

FIGS. 7A and 7B show another embodiment of a method in accordance with the invention. In this method, a degradable material is pumped at high concentration after the earlier proppant stage 60. The degradable material together with the proppant clog up the perforations 62 of the well casing 64 adjacent pay zone 66, creating a temporary plug 68 as best seen in FIG. 7B, for diversion of the new fracture 70 to subsequent pay zone 72. The temporary seal or plug formed of a degradable material may withstand over 17.2 MPa (2500 psi) pressure differential at 121° C. (250° F.) for several hours depending on the formation conditions (see FIGS. 2 and 3). In preferred embodiments, the seal or plug consists of one or more degradable materials only. However, since a risk of over-pumping the proppant into the fracture can exist, in some cases, it may be worthwhile to induce a tail screenout by adding a special chemical or material (a bridging inducing material, such as glass fibers) at the end of proppant stages.

Figure 8:
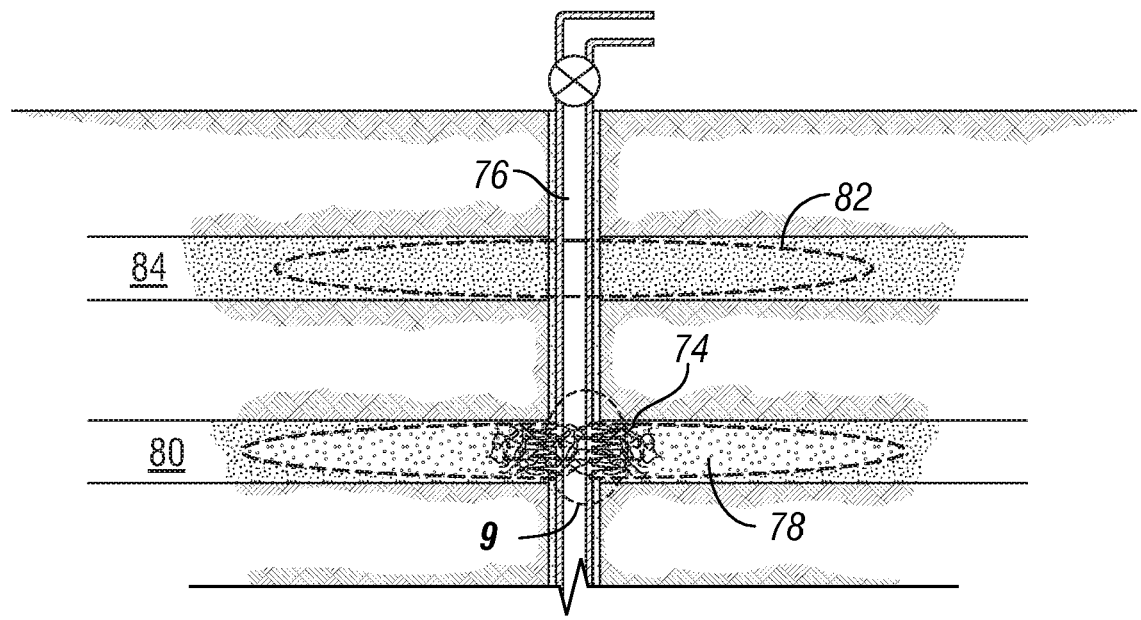
FIG. 8 shows a schematic illustrating plugging of a wellbore in accordance with one embodiment of the invention.
Figure 9:
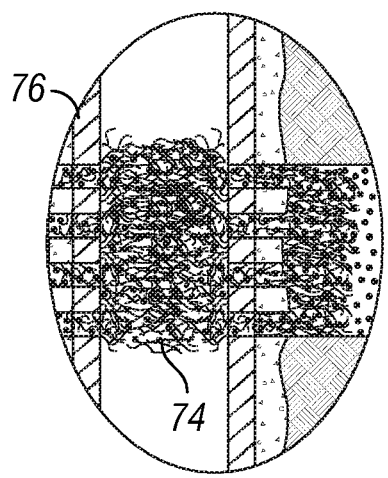
FIG. 9 shows an enlarged section of region 9 from FIG. 8.

FIGS. 8 and 9 show another method in accordance with one embodiment of the invention. In accordance with this method, a temporary fiber bridge plug 74 may be formed of a degradable material in the main passage of the wellbore 76. This method extends the sealing into the wellbore 76 to make sure that a preceding fracture 78 in an earlier pay zone 80 is protected from re-fracturing (re-opening an existing fracture), during the subsequent fracture 82 formation in later pay zone 84. Similar to the method depicted in FIGS. 7A and 7B, a tail screenout may be induced. Although there might exist a certain amount of sand in the perforations and wellbore 76, due to inducement of a tail screenout, the amount of sand in the wellbore 76 will be much less than using the sand plug technique.

All the combinations and permutations of partially or completely plugging wellbores, perforations, and fractures are embodiments of the invention. For example, in the embodiment shown in FIGS. 8 and 9, a degradable material can be pumped together with proppant at the tail end of a fracturing treatment to create a composite proppant-fiber plug in the perforations and/or wellbore. No induced tail screenout is needed. In this case, the best stage diversion may be achieved. The degradable materials should be selected such that they will survive for several hours in the wellbore. A possible disadvantage of the embodiment is the sand production from the material in the wellbore during flowback when the sealing material is gone.

As noted above, methods of the invention that form temporary bridges or seals in the perforations, fracture(s), wellbore, or any combination of these are used for subsequent fracturing or for other operations to be performed downhole. In accordance with some embodiments of the invention, after the temporary seal is formed, the well may undergo various treatments instead of subsequent fracturing. For example, the wellbore may be repaired (acid treatments), or installation of an electric submersible pump (ESP) may be performed. The plugging agent can be selected to last sufficiently long to protect the formation over the expected time period of the subsequent downhole operation.

Therefore, in accordance with some embodiments of the invention, a fracture is temporarily sealed or blocked with a degradable material. The degradable material is used to temporarily protect the fracture from post-job workover fluid damage, or to temporarily protect downhole equipment from fracture flowback damage. The selection of the degradable materials depends on the expected damage, bottomhole conditions, and the durations needed for protection.

The addition of the degradable materials in accordance with embodiments of the invention may be practiced with existing equipment. One of ordinary skill in the art would appreciate that various methods used in the field may be adapted for use with methods of the invention. For example, the degradable materials may be mixed with proppants in blenders. The addition of the chemicals (degradable materials or other additives) may be managed by means of a modified feeder or a flush kit. Alternatively, it is also possible to place the degradable materials by means of coiled tubing in the wellbore. Similarly, it is also possible to use coiled tubing for the injection (addition) of delay or accelerator agents. It is also possible to place the degradable materials via coiled tubing or tubing while simultaneously fracturing down the annulus between the coiled tubing and the casing. The degradable materials can mix with proppant or simply follow the proppant in the casing to cause the bridging.

The methods of the invention may also be combined with methods of using fibers to assist in the transport of proppant, for example in slickwater treatments, for example as described in U.S. Pat. No. 7,275,596. The methods may also be used in treatments in which fibers are also used in proppant-free fluids such as in the pads of fracturing treatments, or in prevention of fluid loss into natural fractures, for example as described in US 2006-0042797. Preferably, the same fiber is used in all stages of these combination treatments. As an example, the same degradable fiber is used in the pad of a fracturing treatment stage, and/or in the main fracturing fluid of the stage to assist proppant transport, and at the end of the stage for degradable material assisted diversion.

It should be noted that the pumping rate may be reduced at the end of a fracturing stage to promote screenout, for example of fibers and proppant in hydraulic fracturing or of fibers in acid fracturing. It should also be noted that the first fracture will be placed in the weakest part of the formation, which could be at the wellhead end, the far end, or anywhere in between, and the layers could be fractured in any sequence. If one or more plugs are in the wellbore rather than in the fractures, this would require removing one or more plugs during the treatment.

In additional embodiments the fracturing fluids and plug forming degradable materials of the invention are pumped in cased hole completions through perforations opened in the casing at selected intervals and timings (by traditional perforations such as those obtained using coil tubing or wireline perforation tools). Wellbores may be vertical, deviated, or horizontal.

In another embodiment the fracturing fluids and plug forming degradable materials of the invention are pumped in cased hole completions across the cement through slots located in the casing at selected intervals and timings. In another embodiment the fracturing fluids and plug forming degradable materials of the invention are pumped in openhole completions across the drilling mudcake at intervals driven by the formation stress

EXAMPLES

Example 1

Polymeric Friction Reducer Fluid

A polymeric friction reducer formulation (Fluid 1) for use in a well treatment according to the invention was prepared by pumping 1 liter per cubic meter ($L/m^3$) (1 gallon per thousand gallons, gpt) of a polymeric friction reducer concentrate to a flow stream of water. The polymeric friction reducer was a formulation containing 28 weight percent of a polyacrylamide derivative friction reducer, 30 weight percent petroleum distillates, 3.5 weight percent ethoxylated alcohol, and 38.5 weight percent water.

Example 2

VES Fracturing Fluid

A viscoelastic surfactant fracturing fluid (Fluid 2) for use in a well treatment of the invention was prepared by pumping 25 $L/m^3$ (25 gpt) of a surfactant concentrate obtained from Rhodia, Inc. Cranbury, New Jersey, U.S.A. and 0.5 weight percent of a partially hydrolyzed polyvinyl acetate derivative concentrate ALCOTEX WD200 (obtained from Synthomer Limited, Harlow, Essex, United Kingdom) to a flow stream of water. The surfactant concentration contained approximately 40 weight percent active erucylamidopropyl betaine and about 1 weight percent of a condensation product of a sodium polynaphthalene sulfonate, with the remainder being substantially water, sodium chloride, and isopropanol. The polyvinyl acetate derivative containing approximately 20 weight percent of a copolymer containing polyvinyl acetate that was approximately 42-45 percent hydrolyzed, having an average molecular weight of about 25,000 and containing less than 2 weight percent methanol.

Example 3

SFR Fluid

A suspending friction reducer formulation (Fluid 3) for use in a well treatment according to the invention was prepared by pumping 4.25 L/m$^3$ (4.25 gpt) of a cetyltrimethyl ammonium chloride concentrate obtained as ARQUAD® 16-50 from Akzo Nobel Surface Chemistry, of Stenungsund, Sweden, and 3.2 Kg/m$^3$ sodium salicylate to a flow stream of water.

Example 4

Slurry Formulations

A series of slurry formulations were prepared by adding various amounts of proppant and degradable fiber to the formulations of Examples 1 through 3 as set out in Table 1 below. The proppant was 20/40 mesh Jordan sand. The fiber was 5-9 mm polylactic acid fiber obtained from Fit Fiber Innovation Technology, Inc. (Johnson City, Tenn.), having a specific gravity of 1.25, a melting point 165° C. (329° F.), a tenacity of 2.5-5 g/denier, and an elongation at break of 50-60%.

TABLE 1

Slurry formulations for pump-in well treatment.

| Slurry | Fluid Formulation | Proppant (Kg/L) | Fiber (Kg/L) |
|---|---|---|---|
| 1 | 1 | 0.000 | 0.000 |
| 2 | 1 | 0.060 | 0.000 |
| 3 | 1 | 0.090 | 0.000 |
| 4 | 1 | 0.120 | 0.000 |
| 5 | 1 | 0.150 | 0.000 |
| 6 | 1 | 0.180 | 0.000 |
| 7 | 2 | 0.240 | 3.600 |
| 8 | 2 | 0.360 | 4.200 |
| 9 | 2 | 0.480 | 4.800 |
| 10 | 3 | 0.000 | 0.000 |
| 11 | 3 | 0.060 | 0.000 |
| 12 | 3 | 0.090 | 0.000 |
| 13 | 3 | 0.120 | 0.000 |
| 14 | 3 | 0.150 | 0.000 |
| 15 | 3 | 0.180 | 0.000 |

Example 5

Well Treatment Schedule

A pumping and fluid formulation schedule for a well treatment according to the invention was developed for Fluids 1 and 2 (Slurries 1 through 9), and is listed in Table 2.

TABLE 2

Well treatment schedule

| Pump Step | Slurry | Pump rate (m$^3$/min) | Fluid Volume (m$^3$) | Pump Time (min) |
|---|---|---|---|---|
| 1 | 1 | 5.56 | 45.4 | 8.2 |
| 2 | 2 | 5.56 | 41.6 | 7.7 |
| 3 | 3 | 5.56 | 37.8 | 7 |
| 4 | 4 | 5.56 | 53.0 | 10 |
| 5 | 5 | 5.56 | 53.0 | 10.1 |
| 6 | 6 | 5.56 | 45.4 | 8.7 |
| 7 | 7 | 5.56 | 7.6 | 1.5 |
| 8 | 8 | 5.56 | 7.6 | 1.5 |
| 9 | 9 | 5.56 | 7.6 | 1.5 |
| 10 | 1 | 5.56 | 12.2 | 2.4 |
| Overflush | 1 | 5.56 | 0.8 | 0.14 |

Example 6

General Well Treatment Procedure

A well treatment method of the invention was developed for a formation using the well treatment schedule of Example 5. The procedure included the steps of: (1) perforating to communicate a formation with the wellbore; (2) performing conventional step rate and step down testing to determine the fracture propagation pressure and fracture closure pressure; (3) pumping slickwater slurry stages with friction reducer (pump steps 1-6 from Table 2); (4) pumping VES stages (pump steps 7-9 from Table 2); (5) flushing and overflushing the fracture (pump step 10 and overflush from Table 2); and (6) repeating these DMAD steps as required for each new pay zone. To check or confirm the isolation efficiency of the fiber plugs, a temperature log may be run. If the pressure decline is low, there is sufficient isolation between stages and the next DMAD cycle of perforation, fracture propagation and consolidated fiber plug formation can proceed. If, however, the pressure decline is high, indicating poor isolation between stages, a kill pill can be pumped to control leakoff at the matrix rate, e.g. 0.3 m$^3$ of a VES fluid with degradable fiber and degradable spherical solids. If the fiber-based pill successfully controls the leakoff, the DMAD fracturing cycle can proceed normally. If, however, the fiber pill does not succeed, if desired, a mechanical or other conventional bridge plug can be placed in the wellbore to isolate the previous fracture stages and start a new DMAD cycle.

Example 7

Actual Well Treatment Procedure

Figure 10:
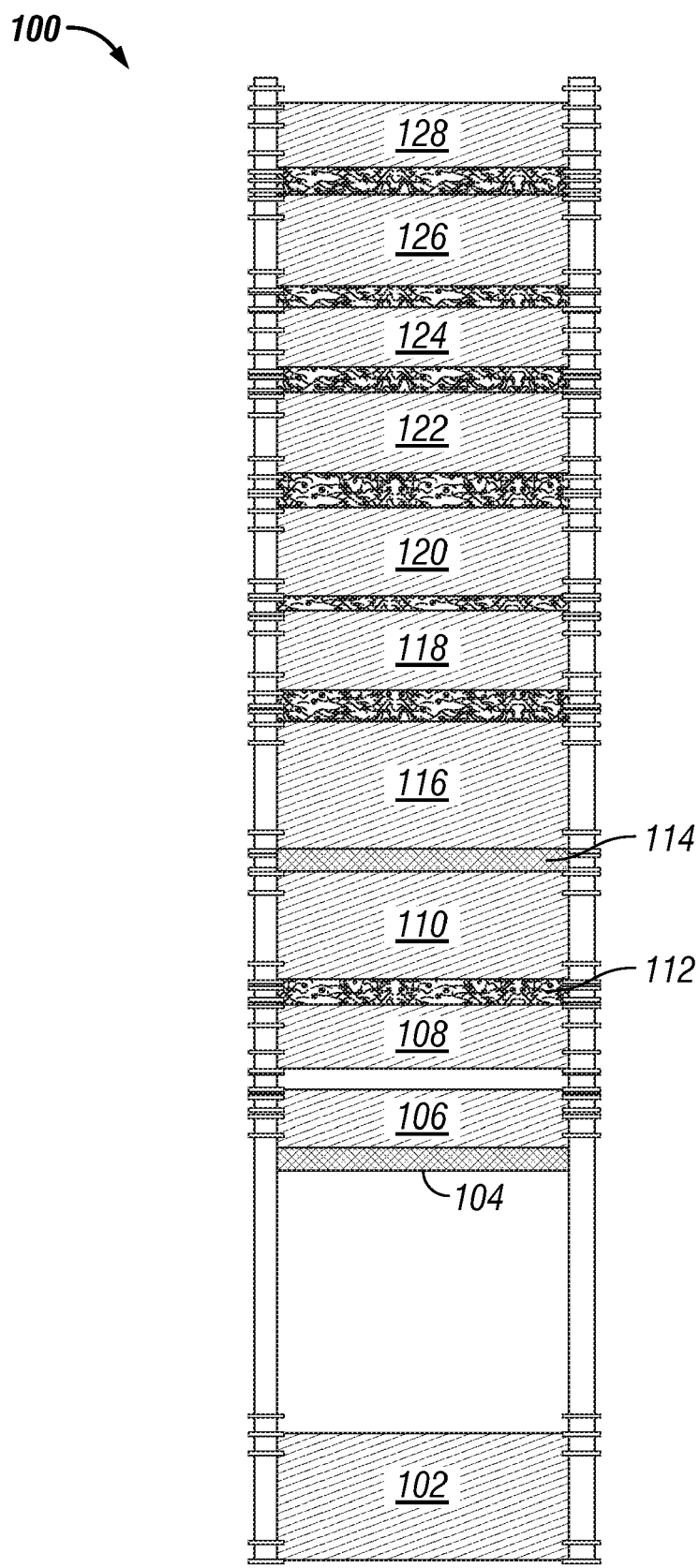
FIG. 10 is a schematic showing the position of the perforations for each stage and the performed operations described in Example 7 below.
Figure 11:
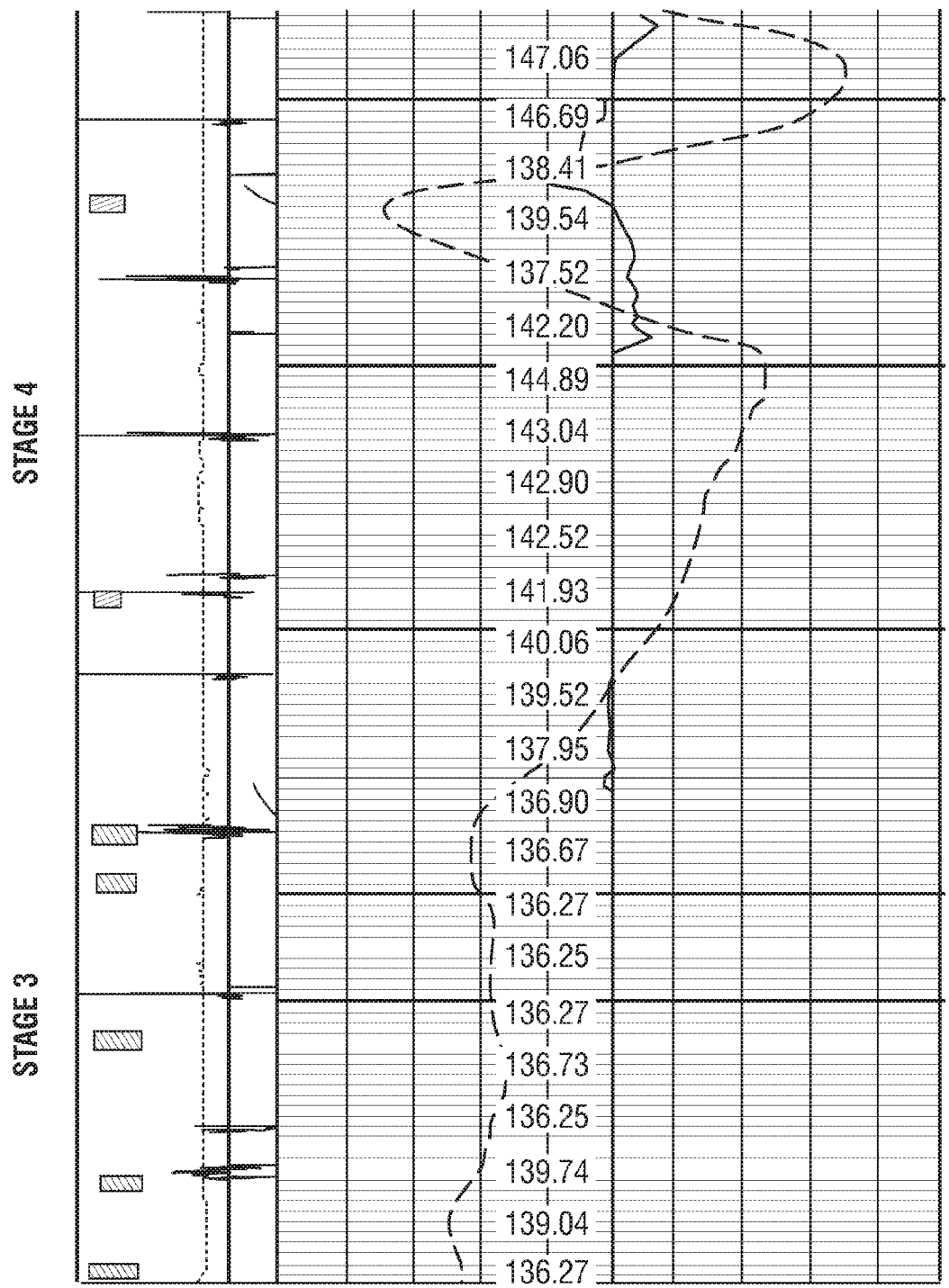
FIG. 11 shows a temperature log during the pumping of stage 4 of Example 7 below, indicating minor fluid entry through the perforations of stage 3 during the fracturing of stage 4.

A series of 11 treatments or stages according to the steps in Examples 5 and 6 were conducted in a tight gas well 100 illustrated in FIG. 10 which is a schematic showing the position of the perforations and plugs for each stage. First stage 102 (2949-3947 m (9676-9997 ft)) was fractured as a test stage to observe the formation for fracture characteristics and to the performance characteristics of the fiber slurry. Then a mechanical bridge plug 104 was set and second stage 106 (2684-2703 m (8807-8867 ft)) was fractured, and a temperature log indicated failure of the fiber plug. The third stage 108 (2618-2669 m (8588-8755 ft)) was then fractured, followed by fourth stage 110 (2515-2598 m (8252-8523 ft)). The temperature log shown in FIG. 11 was taken during the pumping of the fourth stage 110, and only minor fluid entry through the perforations of the third stage 108 during the fracturing of stage 4 indicated a consolidated fiber plug 112 effectively isolated the third stage 108, referring again to the schematic illustration in FIG. 10.

Figure 12:
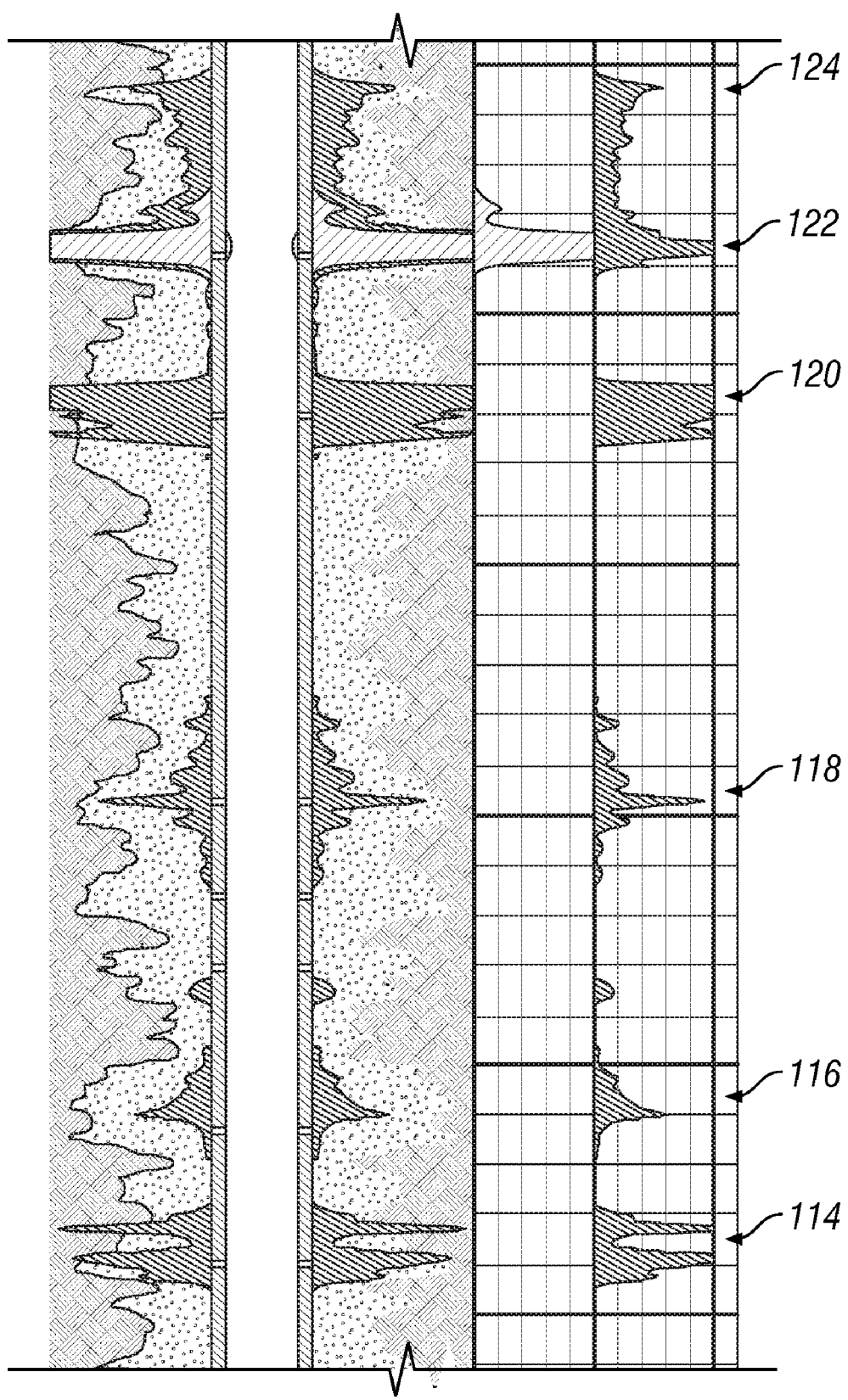
FIG. 12 shows the tracer distribution in the well of Example 7 following injection of different tracers in stage 8 and stage 9, indicating that only minimal entry of the fluid of stage 9 was observed through the perforations of stage 8.

Following the placement of mechanical bridge plug 114, the fifth through eleventh stages 116, 118, 120, 122, 124, 126, 128 were fractured at 2400-2497 m (7874-8191 ft), 2314-2375 m (7592-7791 ft), 2234-2302 m (7330-7553 ft), 2145-2207 m (7038-7241 ft), 2079-2126 m (6820-6975 ft), 1992-2063 m (6536-6770 ft), and 1922-1972 m (6305-6469 ft), respectively. Consolidated fiber plugs were formed after each stage. Two different tracers were injected in the eighth and ninth stages 122, 124. FIG. 12 shows the distribution of the tracers, indicating that only minimal entry of the fluid of the ninth stage 124 was seen in the perforations of the eighth stage 122 and that the other stages were effectively isolated.

Example 8

Well Treatment Schedule with SFR Fluid

An alternate pumping and fluid formulation schedule for a well treatment according to the invention was developed for Fluids 2 and 3 (Slurries 7 through 15), using the SFR fluid in the initial stages, and is listed in Table 3.

TABLE 3

Well treatment schedule with SFR fluid

| Pump Step | Slurry | Pump rate (m³/min) | Fluid Volume (m³) | Pump Time (min) |
|---|---|---|---|---|
| 1 | 10 | 5.56 | 45.4 | 8.2 |
| 2 | 11 | 5.56 | 41.6 | 7.7 |
| 3 | 12 | 5.56 | 37.8 | 7 |
| 4 | 13 | 5.56 | 53.0 | 10 |
| 5 | 14 | 5.56 | 53.0 | 10.1 |
| 6 | 15 | 5.56 | 45.4 | 8.7 |
| 7 | 7 | 5.56 | 7.6 | 1.5 |
| 8 | 8 | 5.56 | 7.6 | 1.5 |
| 9 | 9 | 5.56 | 7.6 | 1.5 |
| 10 | 10 | 5.56 | 12.2 | 2.4 |

It should be understood that throughout this specification, when we list or describe a concentration or amount range as being useful, or suitable, or the like, we intend that any and every concentration within the range, including the end points, is to be considered as having been stated. Furthermore, each numerical value should be read once as modified by the term "about" (unless already expressly so modified) and then read again as not so modified unless otherwise stated in context. For example, "a range of from 1 to 10" is to be read as indicating each and every possible number along the continuum between about 1 and about 10. In other words, when we express a certain range, even if we explicitly identify or refer to only a few specific data points within the range, or even to no data points within the range, it is to be understood that the inventors appreciate and understand that any and all data points within the range are to be considered to have been specified, and that the inventors have possession of the entire range and all points within the range.

All references cited herein are incorporated herein by reference in their entirety to the extent the disclosure in the reference is not inconsistent with this invention, for all jurisdictions where permitted. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A degradable material assisted diversion (DMAD) method of well treatment, comprising the steps of:
   a) injecting a first well treatment fluid into a well penetrating a multilayer formation to propagate a hydraulic fracture in a layer of the formation;
   b) injecting an aqueous slurry into a well penetrating a formation, wherein a solids phase of the slurry comprises an insoluble degradable material;
   c) consolidating the degradable material to form a plug in a perforation, fracture, wellbore or combination thereof in the well;
   d) diverting with the plug while injecting a second well treatment fluid into the well to propagate a subsequent hydraulic fracture in another layer of the formation; and
   e) degrading the consolidated degradable material to remove the plug and restore permeability to the perforation, fracture, wellbore or combination thereof.

2. The method of claim 1, wherein the degradable material comprises a polymer of monomer-derived units selected from the group consisting of esters, aromatic acids, amides and combinations thereof.

3. The method of claim 1, wherein the degradable material is selected from the group consisting of: polymers and copolymers of lactide and glycolide; polyethyleneterephthalate (PET); polybutyleneterephthalate (PBT); polyethylenenaphthalenate (PEN); partially hydrolyzed polyvinyl acetate; polyacrylamide, polymethacrylanlide and derivatives thereof; and combinations and mixtures thereof.

4. The method of claim 1, wherein the degradable material is present in the slurry at a concentration of at least 4.8 g/L (40 lbm/1,000 gal).

5. The method of claim 1, wherein the consolidation comprises inducing a screenout of the solids phase.

6. The method of claim 1, wherein the solids phase includes fiber.

7. The method of claim 1 wherein the solids phase comprises a mixture of a fiber and a particulate material.

8. The method of claim 7, wherein the fiber comprises the degradable material and the particulate material comprises inert proppant.

9. The method of claim 7, wherein the fiber and the particulate material comprise the degradable material.

10. The method of claim 1 wherein the degradation is triggered by a temperature change, by chemical reaction between the degradable material and another reactant, or by a combination thereof.

11. The method of claim 1 wherein the degradation comprises dissolution of the degradable material.

12. The method of claim 1, wherein a fluid phase of the slurry comprises a viscoelastic surfactant, a co-surfactant, a rheology modifier, an aqueous brine, or a combination or mixture thereof.

13. A degradable material assisted diversion (DMAD) fracturing method, comprising the steps of:
   a) injecting well treatment fluid into a well penetrating a multilayer formation to propagate a hydraulic fracture in a layer of the formation;
   b) injecting an aqueous slurry comprising fibers of an insoluble, degradable material in a solids phase to form a plug of the consolidated fibers and isolate the hydraulic fracture from the wellbore, wherein the degradable material is present in the slurry at a concentration of at least 4.8 g/L (40 lbm/1,000 gal), and wherein a fluid phase of the slurry comprises a polymer viscosifier, a viscoelastic surfactant, a co-surfactant, a rheology modifier, a polymeric drag reducer, a surfactant drag reducer, a polymeric drag reduction enhancer, a monomeric drag reduction enhancer, an aqueous brine, or a combination or mixture thereof;

c) with the plug diverting from the previous hydraulic fracture, injecting well treatment fluid into the well to propagate a subsequent hydraulic fracture in another layer of the formation; and d) thereafter degrading the degradable material to remove the plug.

14. The DMAD fracturing method of claim 13, further comprising sequentially repeating steps (b) and (c) one or a plurality of times for diversion from the previous hydraulic fractures and propagation of subsequent hydraulic fracture(s) in other layer(s), wherein the plugs are thereafter removed in step (d) by degrading the degradable material.

15. The DMAD fracturing method of claim 13, wherein a well treatment fluid passageway in the wellbore is maintained open between the formation layers for the subsequent hydraulic fracturing, wherein the previous fracture is isolated from the wellbore by the plug.

16. The DMAD fracturing method of claim 13, further comprising the step of perforation in advance of the fracture propagation in steps (a) and (c).

17. The DMAD fracturing method of claim 13, wherein the slurry injection comprises a tail stage of the hydraulic fracturing.

18. The DMAD fracturing method of claim 17, further comprising pumping one or more stages of proppant free aqueous fluid and one or more stages of proppant laden aqueous fluid.

19. The DMAD fracturing method of claim 18, where said aqueous fluid is a low viscosity slick water fluid selected from a polymeric friction reducing fluid, a surfactant based friction reducing fluid, or mixtures thereof.

20. The DMAD fracturing method of claim 13, wherein the removal of the plug is assisted by a wash.

21. The DMAD fracturing method of claim 13, comprising maintaining pressure in the wellbore adjacent the plug above the formation pressure of the isolated fracture.

22. The DMAD method of claim 13, wherein the fibers are present in the slurry at a concentration of at least 7.2 g/L (60 lbm/1,000 gal).

23. A well treatment fluid for degradable material assisted diversion (DMAD) treatment of a well, comprising an aqueous slurry comprising:

an insoluble degradable material in fiber form, wherein the degradable material comprises a polymer of monomer-derived units selected from the group consisting of esters, aromatic acids, amides and combinations thereof, and wherein the degradable material is present in the slurry at a concentration of at least 4.8 g/L (40 lbm/1,000 gal);

a particulate material; and a fluid phase of the slurry comprising a viscoelastic surfactant, a co-surfactant, a rheology modifier, an aqueous brine, or a combination or mixture thereof.

24. The well treatment fluid of claim 23, wherein the fibers are selected from the group consisting of: polymers and copolymers of lactide and glycolide; polyethyleneterephthalate (PET); polybutyleneterephthalate (PBT); polyethylenenaphthalenate (PEN); partially hydrolyzed polyvinyl acetate; polyacrylamide, polymethacrylamide and derivatives thereof; and combinations and mixtures thereof.

25. The well treatment fluid of claim 23, wherein the particulate material comprises inert proppant having a distribution of sizes.

* * * * *